United States Patent
Watson et al.

(10) Patent No.: US 10,738,564 B2
(45) Date of Patent: *Aug. 11, 2020

(54) FIBROUS BARRIERS AND DEPLOYMENT IN SUBTERRANEAN WELLS

(71) Applicant: THRU TUBING SOLUTIONS, INC., Oklahoma City, OK (US)

(72) Inventors: Brock W. Watson, Sadler, TX (US); Gary P. Funkhouser, Roman Forest, TX (US); Roger L. Schultz, Newcastle, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/390,941

(22) Filed: Dec. 27, 2016

(65) Prior Publication Data

US 2017/0107784 A1    Apr. 20, 2017

Related U.S. Application Data

(60) Division of application No. 15/138,327, filed on Apr. 26, 2016, now Pat. No. 9,567,824, which is a (Continued)

(51) Int. Cl.
*E21B 33/13* (2006.01)
*E21B 43/26* (2006.01)
(Continued)

(52) U.S. Cl.
CPC .............. *E21B 33/13* (2013.01); *C09K 8/516* (2013.01); *C09K 2208/08* (2013.01);
(Continued)

(58) Field of Classification Search
None
See application file for complete search history.

(56) References Cited

U.S. PATENT DOCUMENTS

| 2,109,058 A | 2/1938 | Blee |
| 2,157,493 A | 5/1939 | Miller et al. |

(Continued)

FOREIGN PATENT DOCUMENTS

| WO | 91-11587 A1 | 8/1991 |
| WO | 1991011587 A1 | 8/1991 |

(Continued)

OTHER PUBLICATIONS

International Search Report with Written Opinion dated Jan. 26, 2016 for PCT Patent Application No. PCT/US15/038248, 16 pages.
(Continued)

*Primary Examiner* — Angela M DiTrani Leff
(74) *Attorney, Agent, or Firm* — Smith IP Services, P.C.

(57) ABSTRACT

A fibrous plugging device for use in a subterranean well can include a body having fibers and a retainer material. The retainer material retains a shape of the body. A system for use with a well can include a fibrous plugging device conveyed by fluid flow in the well. The fibrous plugging device includes a body comprising multiple fibers. The fibrous plugging device engages an opening in the well, and thereby seals off the opening. A method for use with a well can include flowing a fluid through the well, thereby conveying at least one fibrous plugging device including a body having multiple fibers, and the fibrous plugging device sealingly engaging an opening in the well, thereby substantially preventing flow through the opening.

7 Claims, 16 Drawing Sheets

Related U.S. Application Data continuation-in-part of application No. 14/698,578, filed on Apr. 28, 2015, and a continuation-in-part of application No. PCT/US2015/038248, filed on Jun. 29, 2015.

(60) Provisional application No. 62/195,078, filed on Jul. 21, 2015, provisional application No. 62/243,444, filed on Oct. 19, 2015.

(51) Int. Cl.
  *E21B 43/11* (2006.01)
  *E21B 34/06* (2006.01)
  *C09K 8/516* (2006.01)

(52) U.S. Cl.
  CPC .............. *E21B 34/06* (2013.01); *E21B 43/11* (2013.01); *E21B 43/26* (2013.01)

(56) References Cited

U.S. PATENT DOCUMENTS

| | | |
|---|---|---|
| 2,370,833 A | 3/1945 | Baker |
| 2,621,351 A | 12/1952 | Piety |
| 2,754,910 A | 7/1956 | Derrick et al. |
| 2,768,693 A | 10/1956 | Hughes, Jr. |
| 2,788,072 A | 4/1957 | Goodwin |
| 2,838,117 A | 6/1958 | Clark, Jr. et al. |
| 2,970,645 A | 2/1961 | Glass |
| 2,988,136 A | 6/1961 | Kowalczyk |
| 3,011,548 A | 12/1961 | Holt |
| 3,028,914 A | 4/1962 | Flickinger |
| 3,086,587 A | 4/1963 | Zandmer et al. |
| 3,119,600 A | 1/1964 | Bitter |
| 3,170,517 A | 2/1965 | Graham et al. |
| 3,174,546 A | 3/1965 | Flickinger |
| 3,251,993 A | 5/1966 | Bader et al. |
| 3,292,700 A | 12/1966 | Berry |
| 3,376,934 A | 4/1968 | Willman et al. |
| 3,399,726 A | 9/1968 | Harris et al. |
| 3,417,821 A | 12/1968 | Tinsley et al. |
| 3,434,539 A | 3/1969 | Merritt |
| 3,437,147 A * | 4/1969 | Davies ................ C09K 8/72 166/193 |
| 3,595,314 A | 7/1971 | Garner |
| 3,707,194 A | 12/1972 | Svaldi |
| 3,814,187 A | 6/1974 | Holamn |
| 3,895,678 A | 7/1975 | Wright et al. |
| 4,167,139 A | 9/1979 | Gleason et al. |
| 4,187,909 A | 2/1980 | Erbstoesser |
| 4,191,561 A | 3/1980 | Quinlan et al. |
| 4,194,561 A | 3/1980 | Stokley et al. |
| 4,244,425 A | 1/1981 | Erbstoesser |
| 4,407,368 A | 10/1983 | Erbstoesser |
| 4,505,334 A | 3/1985 | Doner et al. |
| 4,628,994 A | 12/1986 | Towner et al. |
| 4,716,964 A | 1/1988 | Erbstoesser et al. |
| 4,921,577 A | 5/1990 | Eubank |
| 4,924,811 A | 5/1990 | Axelrod |
| 5,004,048 A | 4/1991 | Bode |
| 5,052,220 A | 10/1991 | Piers |
| 5,052,489 A | 10/1991 | Carisella et al. |
| 5,253,709 A | 10/1993 | Kendrick et al. |
| 5,456,317 A | 10/1995 | Hood, III et al. |
| 5,477,815 A | 12/1995 | O'Rourke |
| 5,507,345 A | 4/1996 | Wehunt, Jr. et al. |
| 5,908,073 A | 6/1999 | Nguyen et al. |
| 6,070,666 A | 6/2000 | Montgomery |
| 6,394,184 B2 | 5/2002 | Tolman et al. |
| 6,427,776 B1 | 8/2002 | Hoffman et al. |
| 6,543,538 B2 | 4/2003 | Tolman et al. |
| 6,655,475 B1 | 12/2003 | Wald |
| 6,973,966 B2 | 12/2005 | Szarka |
| 7,225,869 B2 | 6/2007 | Willet et al. |
| 7,273,099 B2 | 9/2007 | East, Jr. et al. |
| 7,364,051 B2 | 4/2008 | Diaz et al. |
| 7,451,823 B2 | 11/2008 | Wilson |
| 7,527,095 B2 | 5/2009 | Bloess et al. |
| 7,559,363 B2 | 7/2009 | Howell et al. |
| 7,571,773 B1 | 8/2009 | West et al. |
| 7,624,810 B2 | 12/2009 | Fould et al. |
| 7,673,673 B2 | 3/2010 | Surjaatmadja et al. |
| 7,673,688 B1 | 3/2010 | Jones et al. |
| 7,748,452 B2 | 7/2010 | Sullivan et al. |
| 7,810,567 B2 | 10/2010 | Daniels et al. |
| 7,874,365 B2 | 1/2011 | East, Jr. et al. |
| 7,891,424 B2 | 2/2011 | Creel et al. |
| 8,088,717 B2 | 1/2012 | Polizzotti et al. |
| 8,240,392 B2 | 8/2012 | Barnard et al. |
| 8,256,515 B2 | 9/2012 | Barbee |
| 8,281,860 B2 | 10/2012 | Boney et al. |
| 8,307,916 B1 | 11/2012 | Wald |
| 8,397,820 B2 | 3/2013 | Fehr et al. |
| 8,505,632 B2 | 8/2013 | Guerrero et al. |
| 8,561,696 B2 | 10/2013 | Trummer et al. |
| 8,596,362 B2 | 12/2013 | Nelson |
| 8,646,529 B2 | 2/2014 | Clark et al. |
| 8,757,260 B2 | 6/2014 | Luo et al. |
| 8,776,886 B2 | 7/2014 | Rondeau |
| 8,851,172 B1 | 10/2014 | Dudzinski |
| 8,853,137 B2 | 10/2014 | Todd et al. |
| 8,887,803 B2 | 11/2014 | East, Jr. et al. |
| 8,950,438 B2 | 2/2015 | Ryan |
| 8,950,491 B2 | 2/2015 | Frost |
| 9,187,975 B2 | 11/2015 | Rochen |
| 9,284,798 B2 | 3/2016 | Jamison et al. |
| 9,334,704 B2 | 5/2016 | Mineo et al. |
| 9,523,267 B2 | 12/2016 | Schultz et al. |
| 9,551,204 B2 | 1/2017 | Schultz et al. |
| 9,567,824 B2 | 2/2017 | Watson et al. |
| 9,567,825 B2 | 2/2017 | Schultz et al. |
| 9,567,826 B2 | 2/2017 | Schultz et al. |
| 9,708,883 B2 | 7/2017 | Schultz et al. |
| 9,745,820 B2 | 8/2017 | Watson et al. |
| 9,816,341 B2 | 11/2017 | Funkhouser et al. |
| 9,920,589 B2 | 3/2018 | Watson et al. |
| 2002/0007949 A1 | 1/2002 | Tolman et al. |
| 2004/0129460 A1 | 7/2004 | MacQuoid et al. |
| 2004/0261990 A1 | 12/2004 | Boseman et al. |
| 2005/0184083 A1 | 8/2005 | Diaz et al. |
| 2005/0230117 A1 | 10/2005 | Wilkinson |
| 2006/0102336 A1 | 5/2006 | Campbell |
| 2006/0113077 A1 | 6/2006 | Willberg et al. |
| 2006/0169449 A1 | 8/2006 | Mang et al. |
| 2006/0213662 A1 | 9/2006 | Creel et al. |
| 2007/0039739 A1 | 2/2007 | Wilson |
| 2007/0079965 A1 * | 4/2007 | Nguyen ................ C09K 8/68 166/279 |
| 2007/0169935 A1 | 7/2007 | Akbar et al. |
| 2007/0187099 A1 | 8/2007 | Wang |
| 2008/0000639 A1 | 1/2008 | Clark et al. |
| 2008/0093073 A1 | 4/2008 | Bustos et al. |
| 2008/0128133 A1 | 6/2008 | Turley et al. |
| 2008/0196896 A1 | 8/2008 | Bustos et al. |
| 2008/0200352 A1 | 8/2008 | Willberg et al. |
| 2010/0122813 A1 | 5/2010 | Trummer et al. |
| 2010/0147866 A1 | 6/2010 | Witkowski et al. |
| 2010/0152070 A1 | 6/2010 | Ghassemzadeh |
| 2010/0175889 A1 | 7/2010 | Gartz et al. |
| 2010/0200235 A1 | 8/2010 | Luo et al. |
| 2010/0307747 A1 | 12/2010 | Shindgikar et al. |
| 2011/0048712 A1 | 3/2011 | Barbee |
| 2011/0226479 A1 | 9/2011 | Tippel et al. |
| 2011/0297396 A1 | 12/2011 | Hendel et al. |
| 2012/0013893 A1 | 1/2012 | Maida et al. |
| 2012/0031614 A1 | 2/2012 | Rondeau et al. |
| 2012/0085548 A1 | 4/2012 | Fleckenstein et al. |
| 2012/0090835 A1 | 4/2012 | Kefi |
| 2012/0181032 A1 | 7/2012 | Naedler et al. |
| 2012/0211219 A1 | 8/2012 | Mcguire et al. |
| 2012/0234538 A1 | 9/2012 | Martin et al. |
| 2012/0285695 A1 * | 11/2012 | Lafferty ................ C09K 8/03 166/310 |
| 2013/0062055 A1 | 3/2013 | Tolman et al. |

(56) References Cited

U.S. PATENT DOCUMENTS

| | | |
|---|---|---|
| 2013/0098600 A1 | 4/2013 | Roberts |
| 2013/0186632 A1 | 7/2013 | Makowiecki et al. |
| 2013/0233553 A1 | 9/2013 | Bugrin et al. |
| 2013/0292123 A1 | 11/2013 | Murphree et al. |
| 2013/0327528 A1 | 12/2013 | Frost |
| 2013/0341014 A1 | 12/2013 | Trummer et al. |
| 2014/0022537 A1 | 1/2014 | Samson et al. |
| 2014/0116712 A1 | 5/2014 | Bansal et al. |
| 2014/0151052 A1 | 6/2014 | Themig et al. |
| 2014/0274815 A1 | 9/2014 | Lovett et al. |
| 2015/0060069 A1 | 3/2015 | Potapenko et al. |
| 2015/0060072 A1 | 3/2015 | Busby et al. |
| 2015/0075793 A1 | 3/2015 | Dotson et al. |
| 2015/0083423 A1 | 3/2015 | Brannon et al. |
| 2015/0090453 A1 | 4/2015 | Tolman et al. |
| 2015/0122364 A1 | 5/2015 | Cheatham, III et al. |
| 2015/0191988 A1 | 7/2015 | Kiesel et al. |
| 2015/0240583 A1 | 8/2015 | Mineo et al. |
| 2015/0275644 A1 | 10/2015 | Chen et al. |
| 2016/0040520 A1 | 2/2016 | Tolman et al. |
| 2016/0130933 A1 | 5/2016 | Madasu |
| 2016/0237767 A1 | 6/2016 | Snoswell et al. |
| 2016/0251930 A1 | 9/2016 | Jacob et al. |
| 2016/0319628 A1 | 11/2016 | Schultz et al. |
| 2016/0319630 A1 | 11/2016 | Watson et al. |
| 2016/0319631 A1 | 11/2016 | Schultz et al. |
| 2016/0319632 A1 | 11/2016 | Watson et al. |
| 2016/0348465 A1 | 12/2016 | Schultz et al. |
| 2016/0348466 A1 | 12/2016 | Schultz et al. |
| 2016/0348467 A1 | 12/2016 | Watson et al. |
| 2017/0030169 A1 | 2/2017 | Funkhouser et al. |
| 2017/0107784 A1 | 4/2017 | Watson et al. |
| 2017/0107786 A1 | 4/2017 | Schultz et al. |
| 2017/0260828 A1 | 9/2017 | Watson et al. |
| 2017/0275961 A1 | 9/2017 | Schultz et al. |
| 2017/0275965 A1 | 9/2017 | Watson et al. |
| 2017/0335651 A1 | 11/2017 | Watson et al. |
| 2018/0135394 A1 | 5/2018 | Tolman |
| 2018/0245439 A1 | 8/2018 | Entchev et al. |

FOREIGN PATENT DOCUMENTS

| | | |
|---|---|---|
| WO | 2007066254 A2 | 7/2007 |
| WO | 2013184238 A1 | 12/2013 |
| WO | 2014042552 A1 | 3/2014 |
| WO | 2014099206 A1 | 6/2014 |
| WO | 2016175876 A1 | 11/2016 |
| WO | 2016176181 A1 | 11/2016 |
| WO | 2017070105 A1 | 4/2017 |

OTHER PUBLICATIONS

Office Action dated Apr. 13, 2016 for U.S. Appl. No. 14/698,578, 27 pages.
Office Action dated Apr. 13, 2016 for U.S. Appl. No. 14/966,812, 27 pages.
"Fabric." Merriam-Webster.com. Merriam-Webster, n.d. Web. Apr. 5, 2016, 6 pages.
"Rope." Merriam-Webster.com. Merriam-Webster, n.d. Web. Apr. 5, 2016, 10 pages.
Office Action dated Oct. 17, 2016 for U.S. Appl. No. 15/138,968, 32 pages.
Office Action dated Jul. 11, 2016 for U.S. Appl. No. 15/062,669, 26 pages.
Office Action issued Jul. 18, 2016 for U.S. Appl. No. 14/966,812, 22 pages.
Office Action issued Jul. 18, 2016 for U.S. Appl. No. 15/138,408, 26 pages.
Office Action dated Jul. 20, 2016 for U.S. Appl. No. 15/138,327, 29 pages.
Office Action dated Jul. 20, 2016 for U.S. Appl. No. 15/138,378, 25 pages.
Merriam Webster, "Bundle", web page, retrieved Jul. 5, 2016 from www.merriam-webster.com/dictionary/bundle, 7 pages.
thefreedictionary.com; "Threaded", online dictionary definition, dated Sep. 15, 2016, 5 pages.
Specification and drawings for Patent Application No. PCT/US16/29357 filed Apr. 26, 2016, 50 pages.
Merriam-Webster, "Filament", web page, retrieved Aug. 12, 2016 from www.merriam-webster.com/dictionary/filament, 4 pages.
Monosol; "Film Data Sheet", product information brochure, dated Mar. 6, 2012, 1 page.
Merriam-Webster, "Lateral", web page, retrieved Aug. 12, 2016 from www.merriam-webster.com/dictionary/lateral, 5 pages.
Wikipedia, "Nylon 6", web page, retrieved Aug. 12, 2016 from https://en.wikipedia.org/wiki/Nylon_6, 4 pages.
Wolfram Research, "Drag Coefficient", web page, retrieved Aug. 12, 2016 from http://scienceworld.wolfram.com/physics/DragCoefficient.html, 1 page.
International Search Report with Written Opinion dated Aug. 18, 2016 for PCT Patent Application No. PCT/US2016/029314, 18 pages.
International Search Report with Written Opinion dated Aug. 17, 2016 for PCT Patent Application No. PCT/US2016/029357, 18 pages.
Specification and drawings for U.S. Appl. No. 15/296,342, filed Oct. 18, 2016, 120 pages.
Specification and drawings for PCT Patent Application No. PCT/US16/57514, filed Oct. 18, 2016, 120 pages.
Office Action dated Oct. 13, 2016 for U.S. Appl. No. 15/138,449, 35 pages.
Office Action dated Oct. 20, 2016 for U.S. Appl. No. 15/138,327, 23 pages.
Office Action dated Oct. 20, 2016 for U.S. Appl. No. 15/138,685, 35 pages.
Office Action dated Nov. 2, 2016 for U.S. Appl. No. 14/698,578, 28 pages.
Raghavendra R. Hegde, et al.; "Nylon Fibers", online article, dated Apr. 2004, 8 pages.
International Search Report with Written Opinion dated Feb. 1, 2017 for PCT Patent Application No. PCT/US16/059476, 17 pages.
U.S. Office Action dated Feb. 1, 2017 for U.S. Appl. No. 15/296,342, 25 pages.
ICI Americas Inc.; "The HLB System, a time-saving guide to emulsifier selection", company guide, dated Mar. 1980, 22 pages.
Wikipedia; "Hydrophilic-lipophilic Balance", encyclopedia definition via wikipedia.org, dated Jun. 14, 2017, 3 pages.
"Hydrophilic-lipophilic Balance (HLB)", for CH462 Module, dated Mar. 4, 2015, 20 pages.
Office Action dated May 5, 2017 for U.S. Appl. No. 15/347,535, 20 pages.
Office Action dated May 9, 2017 for U.S. Appl. No. 15/138,685, 42 pages.
Office Action dated May 12, 2017 for U.S. Appl. No. 15/296,342, 23 pages.
Office Action dated Feb. 1, 2017 for U.S. Appl. No. 15/296,342, 25 pages.
International Search Report with Written Opinion dated Feb. 1, 2017 for PCT Patent Application No. PCT/US2016/059476, 17 pages.
Office Action dated Feb. 13, 2017 for U.S. Appl. No. 15/138,685, 17 pages.
American Petroleum Institute; "Perforating", glossary of Oilfield Production Terminology, First Edition, p. 186, dated Jan. 1, 1988, 292 pages.
Office Action dated Feb. 14, 2017 for U.S. Appl. No. 15/138,449, 13 pages.
Office Action dated Feb. 15, 2017 for U.S. Appl. No. 15/138,968, 22 pages.
Office Action dated Feb. 22, 2017 for U.S. Appl. No. 15/391,014, 29 pages.
Office Action dated Feb. 24, 2017 for U.S. Appl. No. 15/390,976, 30 pages.
"Knot." Merriam-Webster.com. Merriam-Webster, n.d. Web. Feb. 16, 2017, 13 pages.

(56) References Cited

OTHER PUBLICATIONS

"Thread." Merriam-Webster.com. Merriam-Webster, n.d. Web. Feb. 16, 2017, 12 pages.
Australian Examination Report dated Dec. 5, 2016 for AU Patent Application No. 2016202612, 7 pages.
Australian Examination Report dated Mar. 7, 2017 for AU Patent Application No. 2016202612, 3 pages.
GCC Examination Report dated May 28, 2018 for GCC Patent Application No. 2016-31218, 4 pages.
GCC Examination Report dated May 28, 2018 for GCC Patent Application No. 2016-31220, 4 pages.
GCC Examination Report dated May 27, 2018 for GCC Patent Application No. 2016-31217, 4 pages.
GCC Examination Report dated May 27, 2018 for GCC Patent Application No. 2016-31216, 4 pages.
International Search Report with Written Opinion dated Aug. 1, 2018 for PCT Patent Application No. PCT/US2018/029395, 20 pages.
International Search Report with Written Opinion dated Aug. 2, 2018 for PCT Patent Application No. PCT/US2018/029383, 20 pages.
GCC Examination Report dated Jun. 3, 2018 for GCC Patent Application No. 2016-31222, 4 pages.
Canadian Office Action dated Nov. 23, 2018 for CA Patent Application No. 2,995,533, 4 pages.
Australian Examination Report dated Nov. 14, 2018 for AU Patent Application No. 2017218948, 5 pages.
Australian Examination Report dated Nov. 7, 2018 for AU Patent Application No. 2017219082, 5 pages.
Canadian Office Action dated Oct. 16, 2018 for CA Patent Application No. 2,992,712, 5 pages.
Canadian Office Action dated Dec. 13, 2017 for CA Patent Application No. 2,957,681, 3 pages.
Specification and drawings for U.S. Appl. No. 15/745,608, filed Jan. 17, 2018, 56 pages.
Office Action dated Jun. 11, 2018 for U.S. Appl. No. 15/658,697, 52 pages.
Office Action dated Jul. 20, 2018 for U.S. Appl. No. 15/615,136, 14 pages.
Office Action dated Jul. 11, 2017 for U.S. Appl. No. 15/622,016, 16 pages.
Office Action dated Jul. 13, 2017 for U.S. Appl. No. 15/615,136, 13 pages.
Office Action dated Jul. 14, 2017 for U.S. Appl. No. 15/391,014, 24 pages.
Office Action dated Jul. 17, 2017 for U.S. Appl. No. 15/138,685, 21 pages.
Office Action dated Jul. 20, 2017 for U.S. Appl. No. 15/162,334, 18 pages.
"Yarn"; Definition of Yarn by Merriam-Webster.com, Merrian-Webster, n.d. Web., Aug. 11, 2017, 6 pages.
Specification and Drawings for U.S. Appl. No. 15/567,779, filed Oct. 19, 2017, 63 pages.
Office Action dated Nov. 3, 2017 for U.S. Appl. No. 15/138,685, 15 pages.
Office Action dated Nov. 7, 2017 for U.S. Appl. No. 15/162,334, 16 pages.
Office Action dated Nov. 13, 2017 for U.S. Appl. No. 15/622,016, 44 pages.
Office Action dated Nov. 13, 2017 for U.S. Appl. No. 15/615,136, 34 pages.
Examiner's Answer dated Nov. 15, 2017 for U.S. Appl. No. 15/347,535, 14 pages.
Examiner's Report dated Mar. 28, 2018 for U.S. Appl. No. 15/390,976, 10 pages.
Examiner's Report dated Mar. 28, 2018 for U.S. Appl. No. 15/391,014, 14 pages.
Office Action dated Mar. 29, 2018 for U.S. Appl. No. 15/622,016, 28 pages.
Office Action dated Apr. 20, 2018 for U.S. Appl. No. 15/138,685, 27 pages.
Office Action dated Mar. 30, 2018 for U.S. Appl. No. 15/615,136, 28 pages.
Australian Examination Report dated Jul. 11, 2018 for AU Patent Application No. 53026THR/MRR, 3 pages.
GCC Examination Report dated Jul. 18, 2018 for GCC Patent Application No. GC 2016-31224, 4 pages.
GCC Examination Report dated Jul. 18, 2018 for GCC Patent Application No. GC 2016-31223, 4 pages.
Office Action dated Oct. 9, 2018 for U.S. Appl. No. 15/658,697, 24 pages.
Office Action dated Aug. 16, 2017 for U.S. Appl. No. 14/698,578, 9 pages.
Office Action dated Aug. 16, 2017 for U.S. Appl. No. 15/390,976, 25 pages.
International Search Report with Written Opinion dated Aug. 25, 2017 for PCT Patent Application No. PCT/US2017/036090, 37 pages.
Australian Examination Report dated Nov. 2, 2018 for AU Patent Application No. 2017219089, 5 pages.
Canadian Office Action dated Nov. 30, 2018 for CA Patent Application No. 2,957,681, 3 pages.
Australian Examination Report dated Nov. 21, 2018 for AU Patent Application No. 2017216597, 5 pages.
Office Action dated Dec. 11, 2018 for U.S. Appl. No. 15/615,136, 37 pages.
International Search Report with Written Opinion dated Dec. 3, 2018 for PCT Patent Application No. PCT/US2017/059644, 20 pages.
Office Action dated Sep. 16, 2019 for U.S. Appl. No. 15/609,671, 39 pages.
Office Action dated Sep. 23, 2019 for U.S. Appl. No. 16/214,174, 26 pages.
Lexico Dictionary; "body", Definition of body in English, dated Sep. 17, 2019, 7 pages.
Lexico Dictionary; "knot", Main definitions of knot in English, dated Sep. 17, 2019, 8 pages.
Examiner's Answer dated Sep. 25, 2019 for U.S. Appl. No. 15/658,697, 26 pages.
Office Action dated Oct. 11, 2019 for U.S. Appl. No. 15/567,779, 33 pages.
Office Action dated Oct. 23, 2019 for U.S. Appl. No. 15/745,608, 69 pages.
Office Action dated Jul. 3, 2019 for U.S. Appl. No. 15/726,160, 17 pages.
GCC Examination Report dated Jun. 17, 2019 for GCC Patent Application No. 2016-36182, 3 pages.
Canadian Office Action dated Aug. 2, 2019 for CA Patent Application No. 3,019,772, 5 pages.
GCC Examination Report dated Dec. 24, 2018 for GCC Patent Application No. 2016-31224, 4 pages.
Australian Examination Report dated Feb. 18, 2019 for AU Patent Application No. 2017219082, 3 pages.
GCC Examination Report dated Dec. 24, 2018 for GCC Patent Application No. 2016-31223, 4 pages.
Office Action dated Jan. 29, 2019 for U.S. Appl. No. 15/622,016, 22 pages.
Australian Examination Report dated Feb. 18, 2019 for AU Patent Application No. 2017279758, 3 pages.
Office Action dated Feb. 4, 2019 for U.S. Appl. No. 15/567,779, 58 pages.
Office Action dated Feb. 11, 2019 for U.S. Appl. No. 16/214,174, 17 pages.
Office Action dated Feb. 11, 2019 for U.S. Appl. No. 16/238,838, 25 pages.
Australian Examination Report dated Feb. 26, 2019 for AU Patent Application No. 2017276220, 4 pages.
Office Action dated Mar. 18, 2019 for U.S. Appl. No. 15/658,697, 34 pages.
Office Action dated Mar. 18, 2019 for U.S. Appl. No. 15/726,160, 62 pages.

(56) References Cited

OTHER PUBLICATIONS

GCC Examination Report dated Dec. 23, 2018 for GCC Patent Application No. 2016-31222, 4 pages.
Perf Sealers; "History of Perforation Ball Sealers in the Oil and Gas Industry", company website article, dated 2014-2019, 4 pages.
Office Action dated Mar. 20, 2019 for U.S. Appl. No. 15/432,041, 39 pages.
Australian Examination Report dated Dec. 18, 2019 for AU Patent Application No. 2017347510, 8 pages.
Canadian Office Action dated Dec. 9, 2019 for CA Patent Application No. 3,019,772, 4 pages.
Examination Report dated Dec. 24, 2018 for GCC Patent Application No. 2016-31224, 4 pages.
Examination Report dated Apr. 2, 2019 for GCC Patent Application No. 2016-31243, 4 pages.
Examination Report dated Mar. 2, 2019 for GCC Patent Application No. 2016-31242, 4 pages.
Oxford Dictionaries; "body", definition of body in English, dated May 23, 2019, 7 pages.
Office Action dated May 29, 2019 for U.S. Appl. No. 15/567,779, 18 pages.
Office Action dated May 29, 2019 for U.S. Appl. No. 16/214,174, 26 pages.
Examination Report dated Mar. 11, 2019 for GCC Patent Application No. 2016-32206, 5 pages.
Examiner's Answer dated Jun. 3, 2019 for U.S. Appl. No. 15/615,136, 17 pages.
Examination Report dated Feb. 12, 2019 for GCC Patent Application No. 2017-33854, 5 pages.
Office Action dated Apr. 19, 2019 for U.S. Appl. No. 15/609,671, 23 pages.
Canadian Office Action dated Apr. 11, 2019 for CA Patent Application No. 2,992,712, 4 pages.
Specifications and drawings for U.S. Appl. No. 16/402,396, filed May 3, 2019, 93 pages.

\* cited by examiner

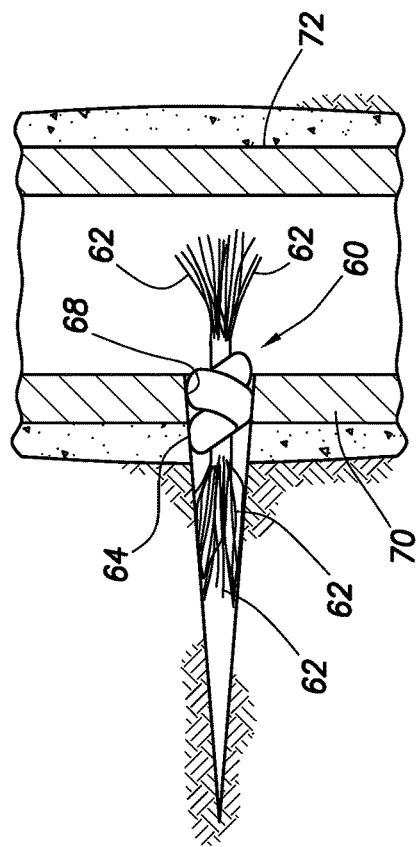
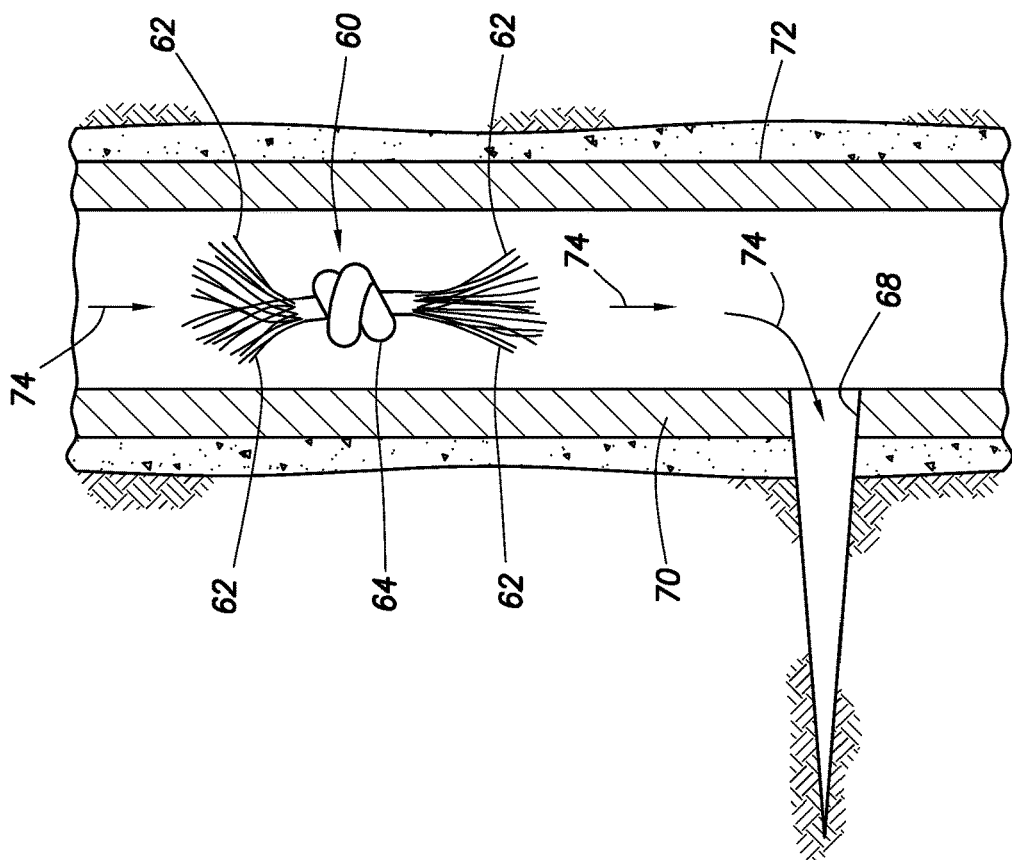

FIBROUS BARRIERS AND DEPLOYMENT IN SUBTERRANEAN WELLS

CROSS-REFERENCE TO RELATED APPLICATIONS

This application is a division of prior application Ser. No. 15/138,327 filed on 26 Apr. 2016, which is a continuation-in-part of U.S. application Ser. No. 14/698,578 filed on 28 Apr. 2015, a continuation-in-part of International application serial no. PCT/US15/38248 filed on 29 Jun. 2015, claims the benefit of the filing date of U.S. provisional application Ser. No. 62/195,078 filed on 21 Jul. 2015, and claims the benefit of the filing date of U.S. provisional application Ser. No. 62/243,444 filed on 19 Oct. 2015. The entire disclosures of these prior applications are incorporated herein by this reference.

BACKGROUND

This disclosure relates generally to equipment utilized and operations performed in conjunction with a subterranean well and, in one example described below, more particularly provides for fibrous barriers and their deployment in wells.

It can be beneficial to be able to control how and where fluid flows in a well. For example, it may be desirable in some circumstances to be able to prevent fluid from flowing into a particular formation zone. As another example, it may be desirable in some circumstances to cause fluid to flow into a particular formation zone, instead of into another formation zone. As yet another example, it may be desirable to temporarily prevent fluid from flowing through a passage of a well tool. Therefore, it will be readily appreciated that improvements are continually needed in the art of controlling fluid flow in wells.

BRIEF DESCRIPTION OF THE DRAWINGS

FIGS. 6A & B are representative partially cross-sectional views of the flow conveyed device in a well, the device being conveyed by flow in FIG. 6A, and engaging a casing opening in FIG. 6B.

DETAILED DESCRIPTION

Figure 1:
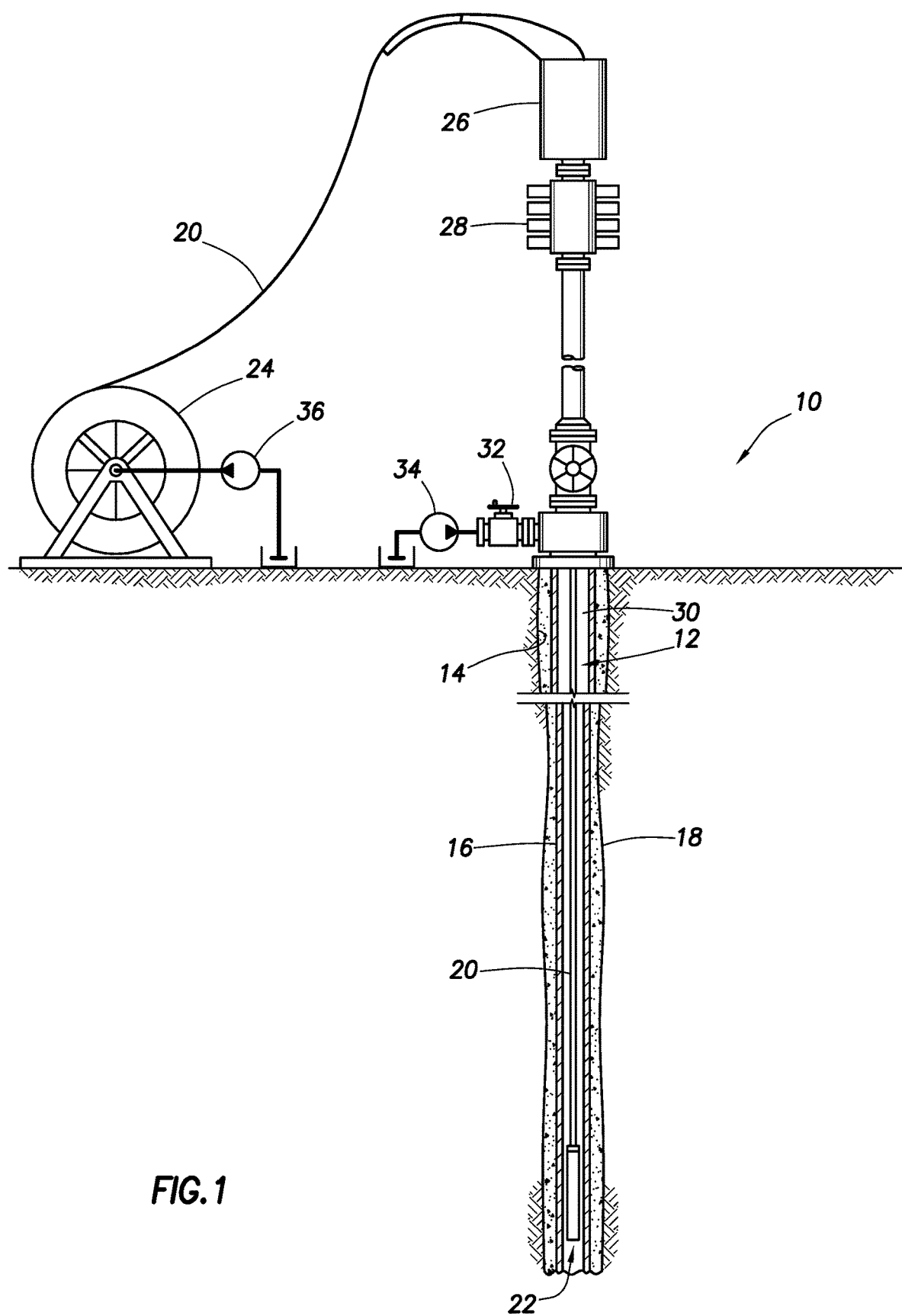
FIG. 1 is a representative partially cross-sectional view of an example of a well system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is conveyed into a wellbore 14 lined with casing 16 and cement 18. Although multiple casing strings would typically be used in actual practice, for clarity of illustration only one casing string 16 is depicted in the drawings.

Although the wellbore 14 is illustrated as being vertical, sections of the wellbore could instead be horizontal or otherwise inclined relative to vertical. Although the wellbore 14 is completely cased and cemented as depicted in FIG. 1, any sections of the wellbore in which operations described in more detail below are performed could be uncased or open hole. Thus, the scope of this disclosure is not limited to any particular details of the system 10 and method.

The tubular string 12 of FIG. 1 comprises coiled tubing 20 and a bottom hole assembly 22. As used herein, the term "coiled tubing" refers to a substantially continuous tubing that is stored on a spool or reel 24. The reel 24 could be mounted, for example, on a skid, a trailer, a floating vessel, a vehicle, etc., for transport to a wellsite. Although not shown in FIG. 1, a control room or cab would typically be provided with instrumentation, computers, controllers, recorders, etc., for controlling equipment such as an injector 26 and a blowout preventer stack 28.

As used herein, the term "bottom hole assembly" refers to an assembly connected at a distal end of a tubular string in a well. It is not necessary for a bottom hole assembly to be positioned or used at a "bottom" of a hole or well.

When the tubular string 12 is positioned in the wellbore 14, an annulus 30 is formed radially between them. Fluid, slurries, etc., can be flowed from surface into the annulus 30 via, for example, a casing valve 32. One or more pumps 34 may be used for this purpose. Fluid can also be flowed to surface from the wellbore 14 via the annulus 30 and valve 32.

Fluid, slurries, etc., can also be flowed from surface into the wellbore 14 via the tubing 20, for example, using one or more pumps 36. Fluid can also be flowed to surface from the wellbore 14 via the tubing 20.

In the further description below of the examples of FIGS. 2A-14, one or more flow conveyed devices are used to block or plug openings in the system 10 of FIG. 1. However, it should be clearly understood that these methods and the flow conveyed device may be used with other systems, and the flow conveyed device may be used in other methods in keeping with the principles of this disclosure.

The example methods described below allow existing fluid passageways to be blocked permanently or temporarily in a variety of different applications. Certain flow conveyed device examples described below are made of a fibrous material and may comprise a central body, a "knot" or other enlarged geometry.

The devices may be conveyed into the passageways or leak paths using pumped fluid. Fibrous material extending outwardly from a body of a device can "find" and follow the fluid flow, pulling the enlarged geometry or fibers into a restricted portion of a flow path, causing the enlarged geometry and additional strands to become tightly wedged into the flow path, thereby sealing off fluid communication.

The devices can be made of degradable or non-degradable materials. The degradable materials can be either self-degrading, or can require degrading treatments, such as, by exposing the materials to certain acids, certain base compositions, certain chemicals, certain types of radiation (e.g., electromagnetic or "nuclear"), or elevated temperature. The exposure can be performed at a desired time using a form of well intervention, such as, by spotting or circulating a fluid in the well so that the material is exposed to the fluid.

In some examples, the material can be an acid degradable material (e.g., nylon, etc.), a mix of acid degradable material (for example, nylon fibers mixed with particulate such as calcium carbonate), self-degrading material (e.g., poly-lactic acid (PLA), poly-glycolic acid (PGA), etc.), material that degrades by galvanic action (such as, magnesium alloys, aluminum alloys, etc.), a combination of different self-degrading materials, or a combination of self-degrading and non-self-degrading materials.

Multiple materials can be pumped together or separately. For example, nylon and calcium carbonate could be pumped as a mixture, or the nylon could be pumped first to initiate a seal, followed by calcium carbonate to enhance the seal.

In certain examples described below, the device can be made of knotted fibrous materials. Multiple knots can be used with any number of loose ends. The ends can be frayed or un-frayed. The fibrous material can be rope, fabric, metal wool, cloth or another woven or braided structure.

The device can be used to block open sleeve valves, perforations or any leak paths in a well (such as, leaking connections in casing, corrosion holes, etc.). Any opening or passageway through which fluid flows can be blocked with a suitably configured device. For example, an intentionally or inadvertently opened rupture disk, or another opening in a well tool, could be plugged using the device.

In one example method described below, a well with an existing perforated zone can be re-completed. Devices (either degradable or non-degradable) are conveyed by flow to plug all existing perforations.

The well can then be re-completed using any desired completion technique. If the devices are degradable, a degrading treatment can then be placed in the well to open up the plugged perforations (if desired).

In another example method described below, multiple formation zones can be perforated and fractured (or otherwise stimulated, such as, by acidizing) in a single trip of the bottom hole assembly 22 into the well. In the method, one zone is perforated, the zone is stimulated, and then the perforated zone is plugged using one or more devices.

These steps are repeated for each additional zone, except that a last zone may not be plugged. All of the plugged zones are eventually unplugged by waiting a certain period of time (if the devices are self-degrading), by applying an appropriate degrading treatment, or by mechanically removing the devices.

Referring specifically now to FIGS. 2A-D, steps in an example of a method in which the bottom hole assembly 22 of FIG. 1 can be used in re-completing a well are representatively illustrated. In this method (see FIG. 2A), the well has existing perforations 38 that provide for fluid communication between an earth formation zone 40 and an interior of the casing 16. However, it is desired to re-complete the zone 40, in order to enhance the fluid communication.

Figure 2A:
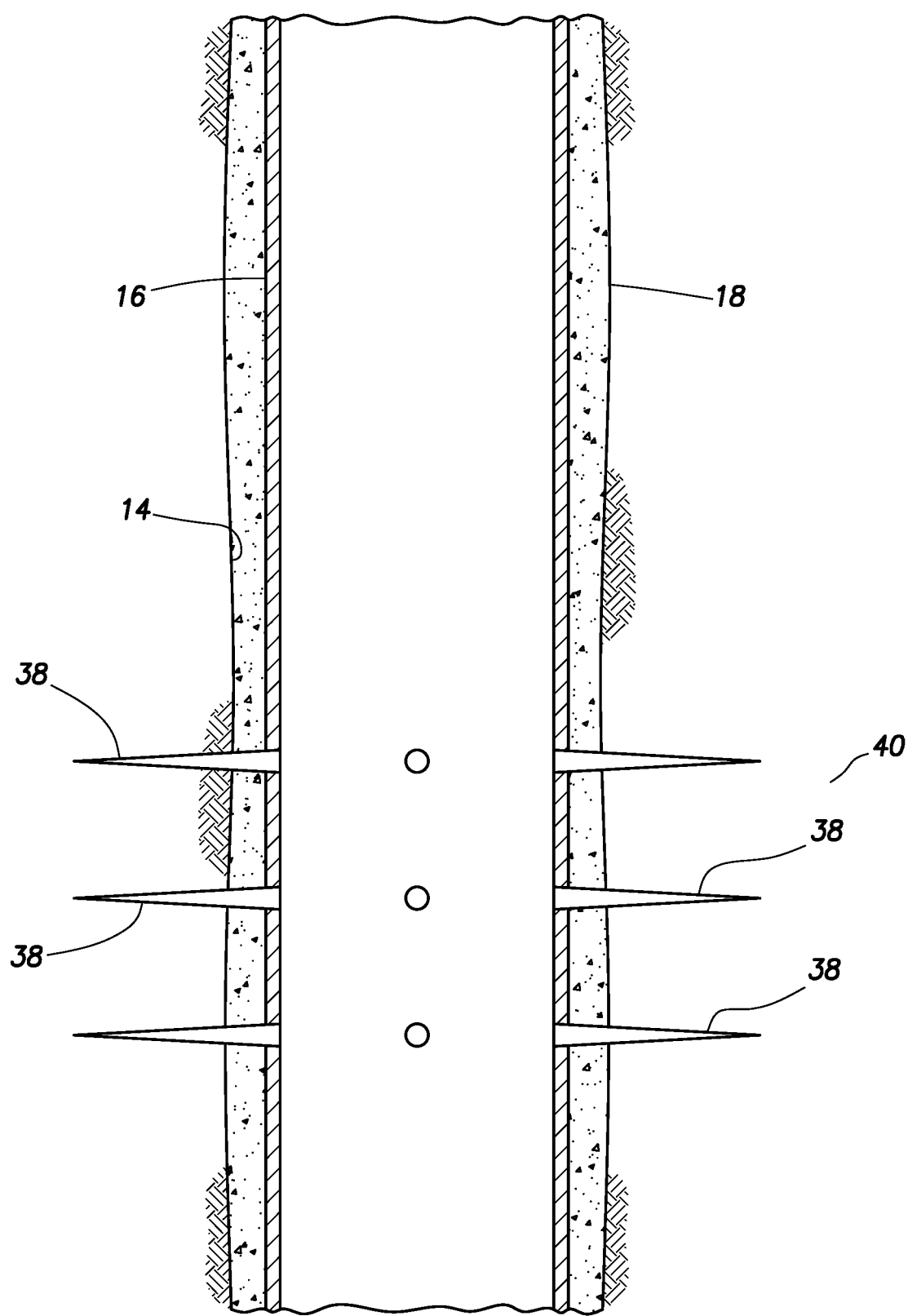
FIGS. 2A-D are enlarged scale representative partially cross-sectional views of steps in an example of a re-completion method that may be practiced with the system of FIG. 1.
Figure 2B:
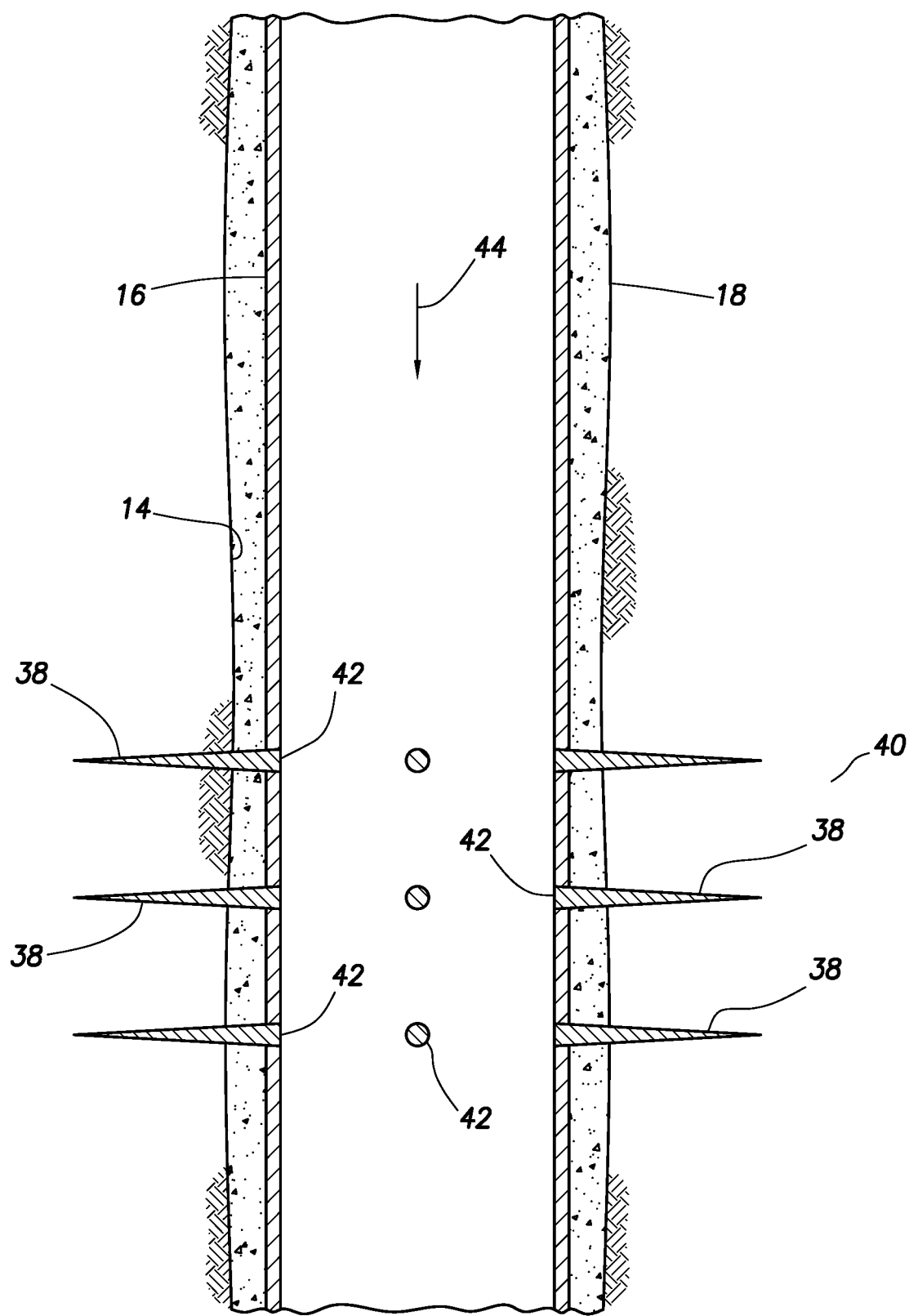

Referring additionally now to FIG. 2B, the perforations 38 are plugged, thereby preventing flow through the perforations into the zone 40. Plugs 42 in the perforations can be flow conveyed devices, as described more fully below. In that case, the plugs 42 can be conveyed through the casing 16 and into engagement with the perforations 38 by fluid flow 44.

Figure 2C:
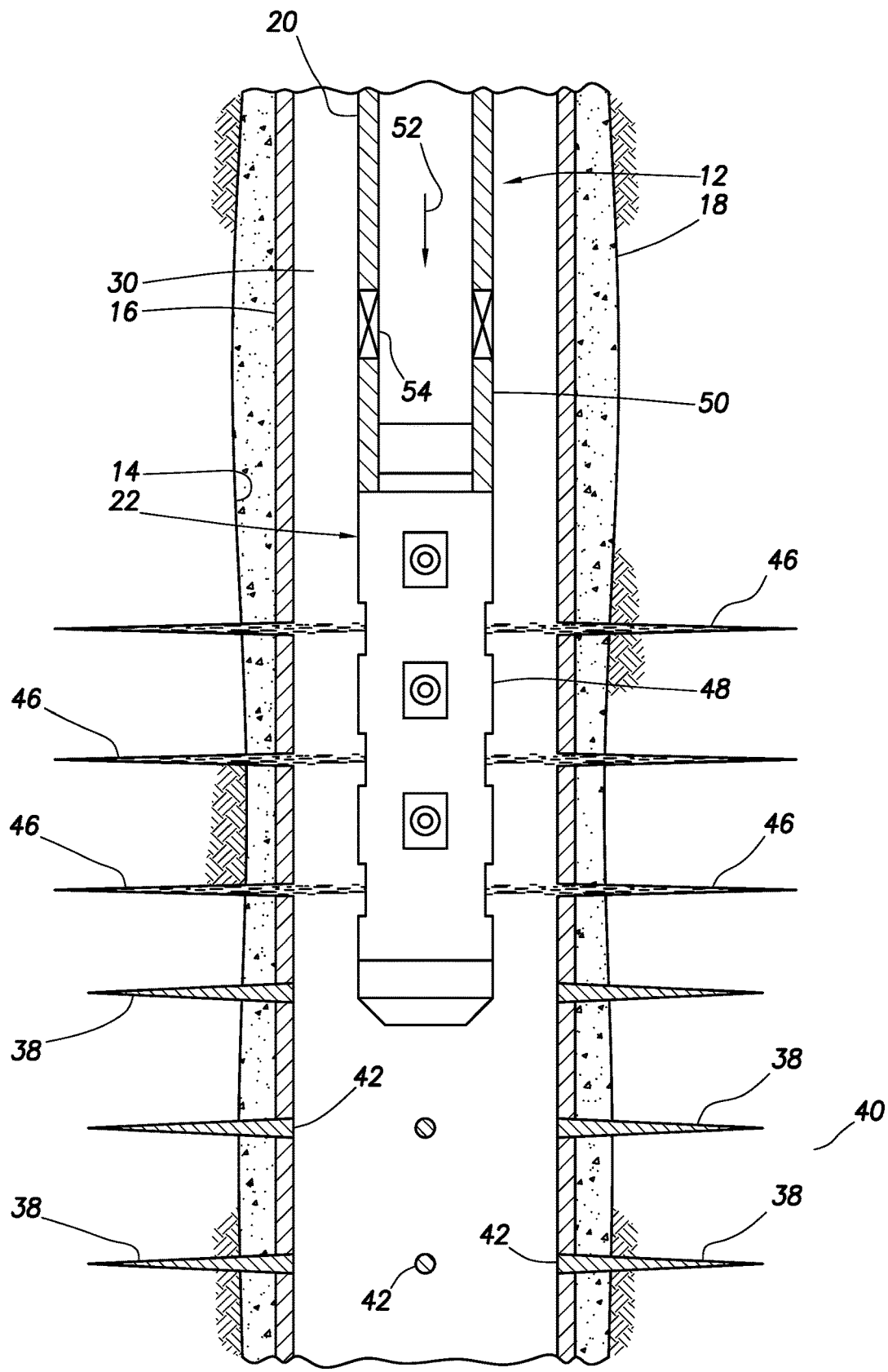

Referring additionally now to FIG. 2C, new perforations 46 are formed through the casing 16 and cement 18 by use of an abrasive jet perforator 48. In this example, the bottom hole assembly 22 includes the perforator 48 and a circulating valve assembly 50. Although the new perforations 46 are depicted as being formed above the existing perforations 38, the new perforations could be formed in any location in keeping with the principles of this disclosure.

Note that other means of providing perforations 46 may be used in other examples. Explosive perforators, drills, etc., may be used if desired. The scope of this disclosure is not limited to any particular perforating means, or to use with perforating at all.

The circulating valve assembly 50 controls flow between the coiled tubing 20 and the perforator 48, and controls flow between the annulus 30 and an interior of the tubular string 12. Instead of conveying the plugs 42 into the well via flow 44 through the interior of the casing 16 (see FIG. 2B), in other examples the plugs could be deployed into the tubular string 12 and conveyed by fluid flow 52 through the tubular string prior to the perforating operation. In that case, a valve 54 of the circulating valve assembly 50 could be opened to allow the plugs 42 to exit the tubular string 12 and flow into the interior of the casing 16 external to the tubular string.

Figure 2D:
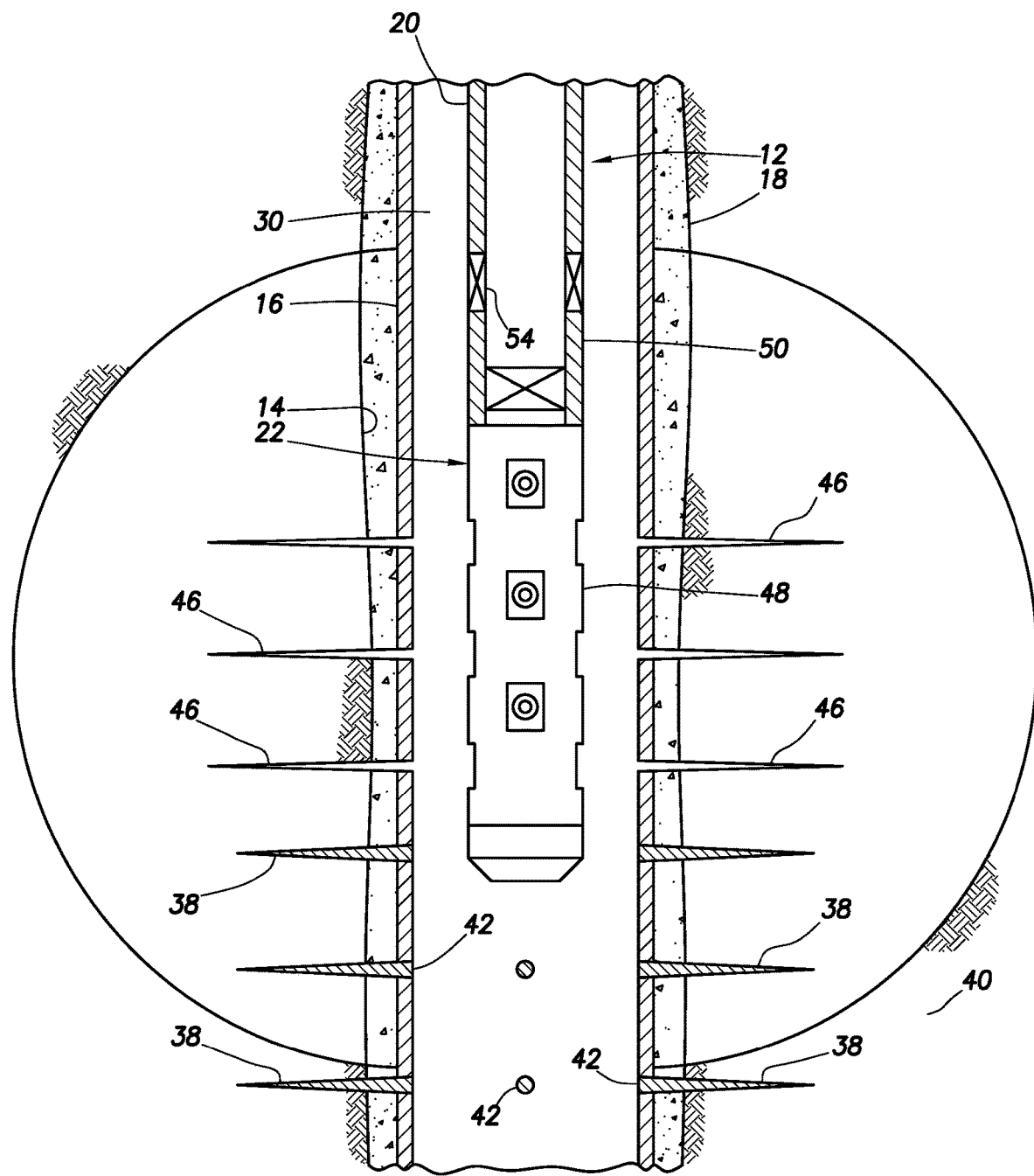

Referring additionally now to FIG. 2D, the zone 40 has been fractured by applying increased pressure to the zone after the perforating operation. Enhanced fluid communication is now permitted between the zone 40 and the interior of the casing 16.

Note that fracturing is not necessary in keeping with the principles of this disclosure. A zone could be stimulated (for example, by acidizing) with or without fracturing. Thus, although fracturing is described for certain examples, it should be understood that other types of stimulation treatments, in addition to or instead of fracturing, could be performed.

In the FIG. 2D example, the plugs 42 prevent the pressure applied to fracture the zone 40 via the perforations 46 from leaking into the zone via the perforations 38. The plugs 42 may remain in the perforations 38 and continue to prevent flow through the perforations, or the plugs may degrade, if desired, so that flow is eventually permitted through the perforations.

In other examples, fractures may be formed via the existing perforations 38, and no new perforations may be formed. In one technique, pressure may be applied in the casing 16 (e.g., using the pump 34), thereby initially fracturing the zone 40 via some of the perforations 38 that receive most of the fluid flow 44. After the initial fracturing of the zone 40, and while the fluid is flowed through the casing 16, plugs 42 can be released into the casing, so that the plugs seal off those perforations 38 that are receiving most of the fluid flow.

In this way, the fluid 44 will be diverted to other perforations 38, so that the zone 40 will also be fractured via those other perforations 38. The plugs 42 can be released into the casing 16 continuously or periodically as the fracturing operation progresses, so that the plugs gradually seal off all, or most, of the perforations 38 as the zone 40 is fractured via the perforations. That is, at each point in the fracturing operation, the plugs 42 will seal off those perforations 38 through which most of the fluid flow 44 passes, which are the perforations via which the zone 40 has been fractured.

Referring additionally now to FIGS. 3A-D, steps in another example of a method in which the bottom hole assembly 22 of FIG. 1 can be used in completing multiple zones 40a-c of a well are representatively illustrated. The multiple zones 40a-c are each perforated and fractured during a single trip of the tubular string 12 into the well.

Figure 3A:
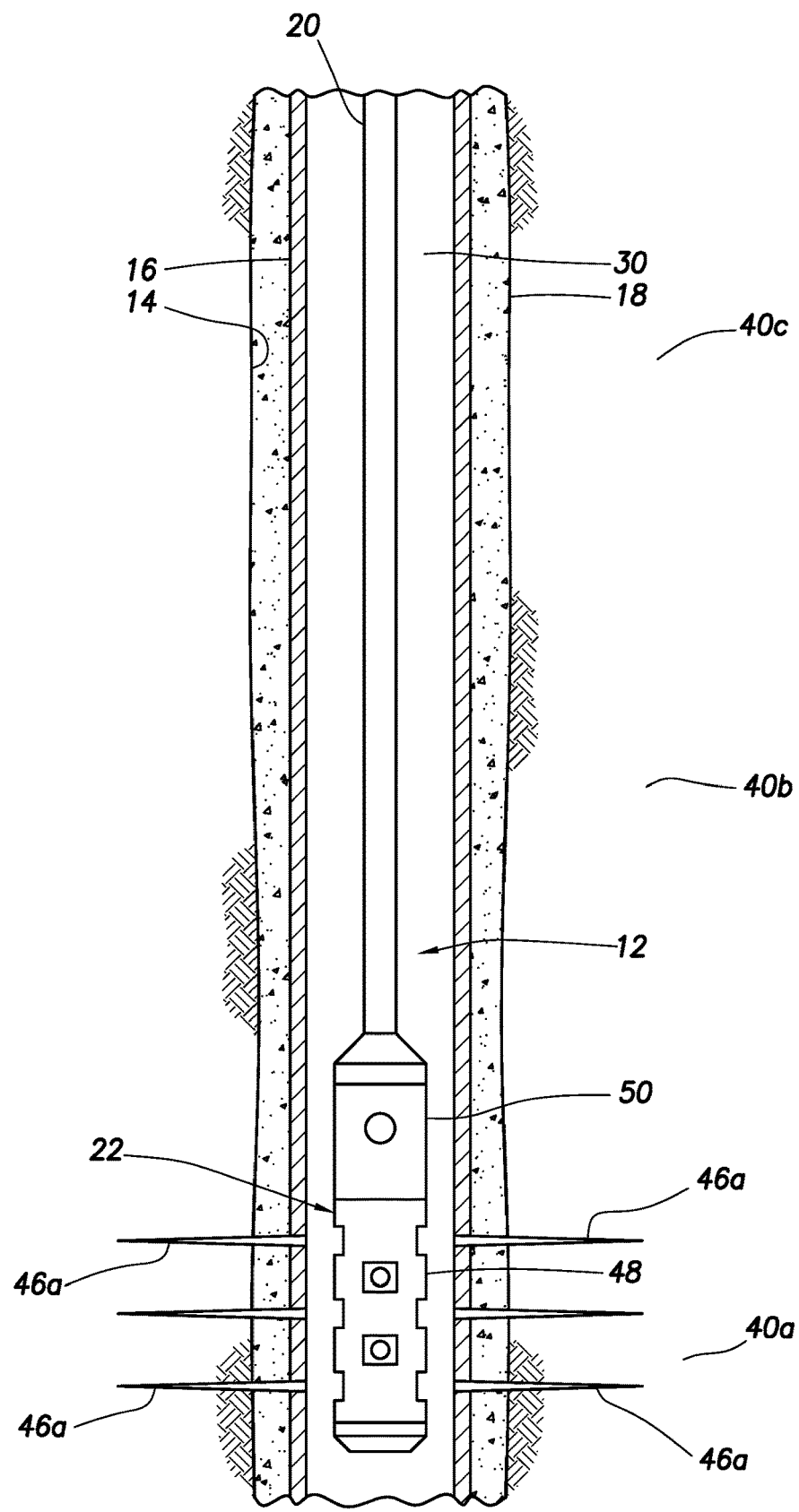
FIGS. 3A-D are representative partially cross-sectional views of steps in another example of a method that may be practiced with the system of FIG. 1.

In FIG. 3A, the tubular string 12 has been deployed into the casing 16, and has been positioned so that the perforator 48 is at the first zone 40a to be completed. The perforator 48 is then used to form perforations 46a through the casing 16 and cement 18, and into the zone 40a.

Figure 3B:
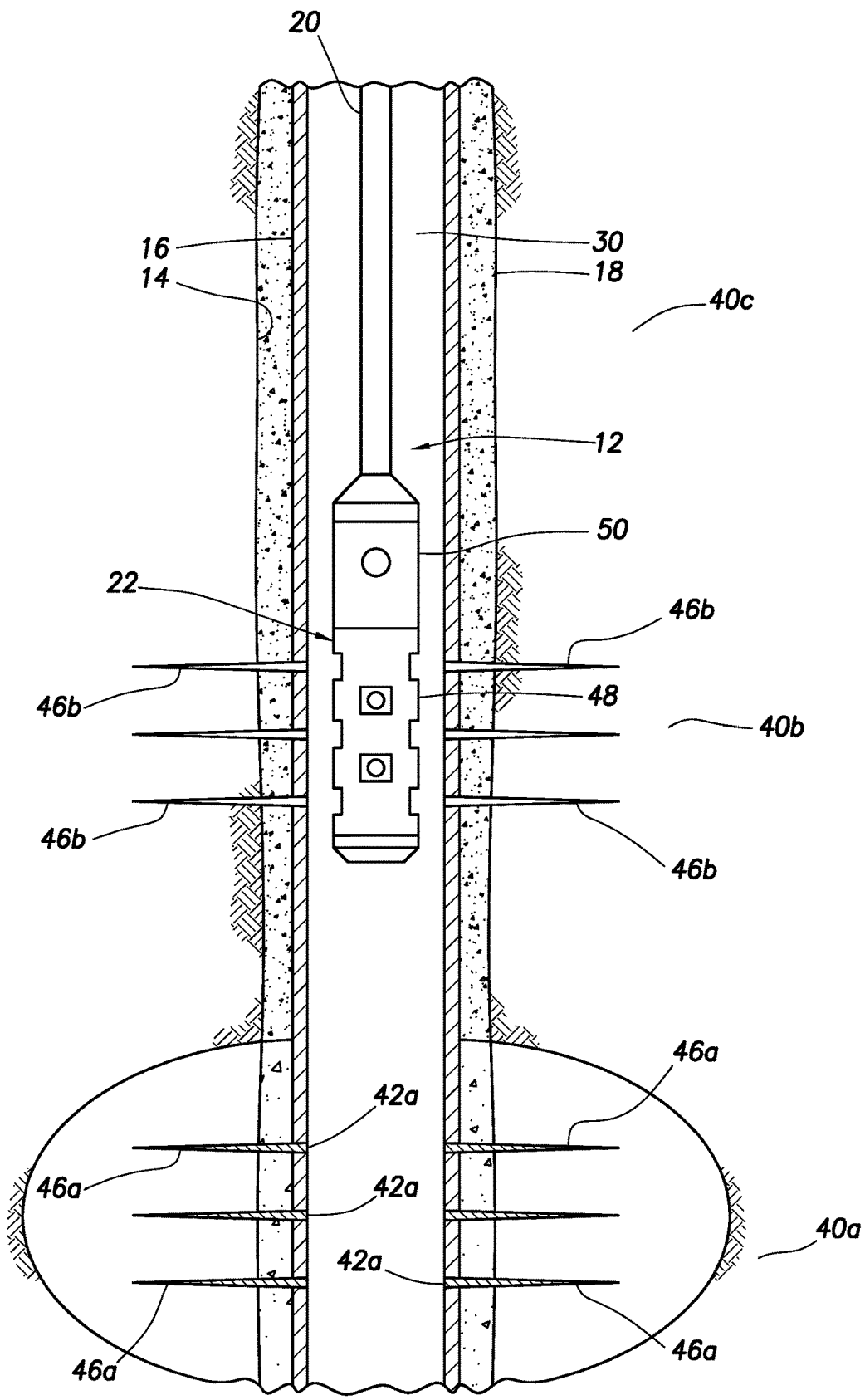

In FIG. 3B, the zone 40a has been fractured by applying increased pressure to the zone via the perforations 46a. The fracturing pressure may be applied, for example, via the annulus 30 from the surface (e.g., using the pump 34 of FIG. 1), or via the tubular string 12 (e.g., using the pump 36 of FIG. 1). The scope of this disclosure is not limited to any particular fracturing means or technique, or to the use of fracturing at all.

After fracturing of the zone 40a, the perforations 46a are plugged by deploying plugs 42a into the well and conveying them by fluid flow into sealing engagement with the perforations. The plugs 42a may be conveyed by flow 44 through the casing 16 (e.g., as in FIG. 2B), or by flow 52 through the tubular string 12 (e.g., as in FIG. 2C).

The tubular string 12 is repositioned in the casing 16, so that the perforator 48 is now located at the next zone 40b to be completed. The perforator 48 is then used to form perforations 46b through the casing 16 and cement 18, and into the zone 40b. The tubular string 12 may be repositioned before or after the plugs 42a are deployed into the well.

Figure 3C:
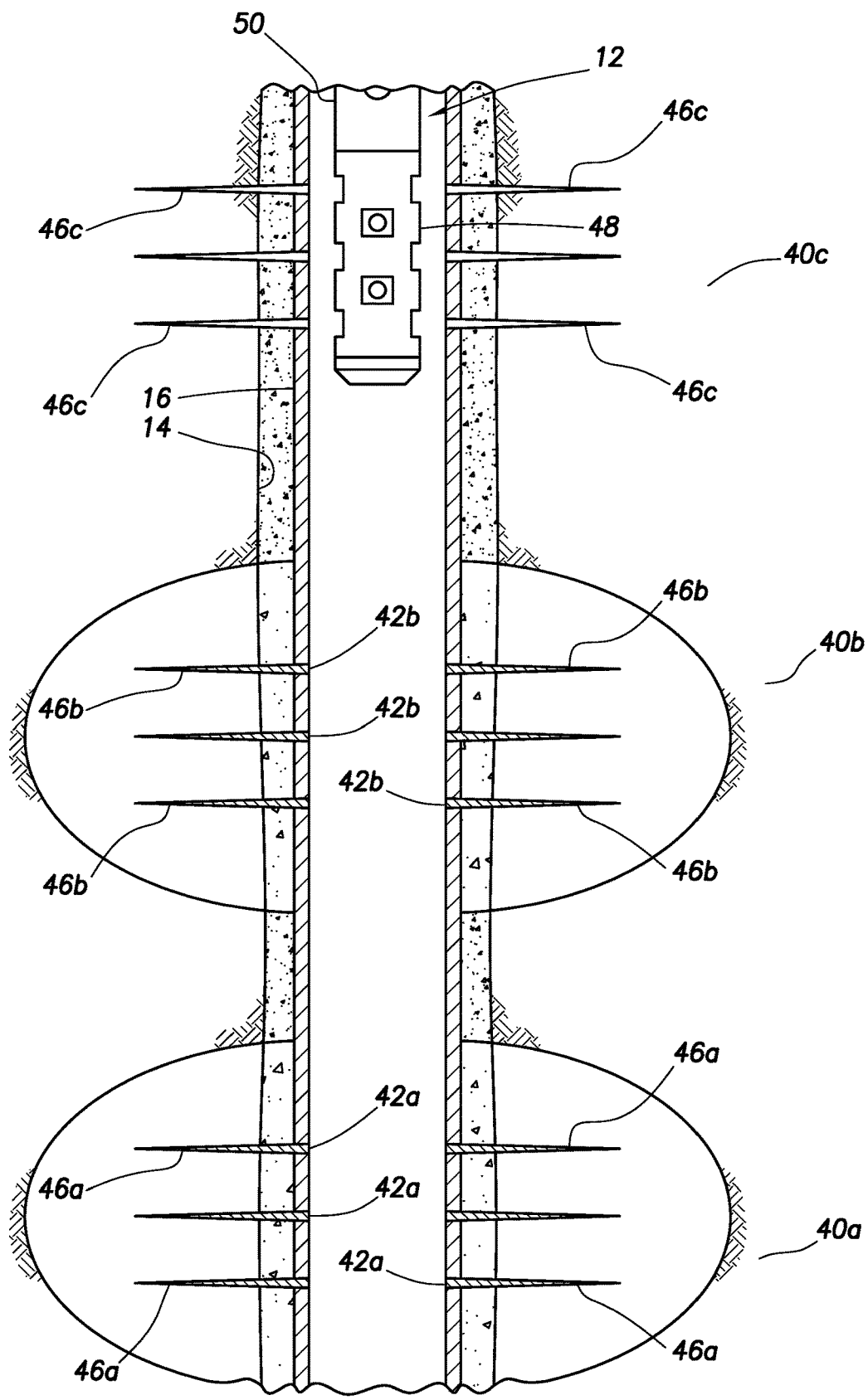

In FIG. 3C, the zone 40b has been fractured by applying increased pressure to the zone via the perforations 46b. The fracturing pressure may be applied, for example, via the annulus 30 from the surface (e.g., using the pump 34 of FIG. 1), or via the tubular string 12 (e.g., using the pump 36 of FIG. 1).

After fracturing of the zone 40b, the perforations 46b are plugged by deploying plugs 42b into the well and conveying them by fluid flow into sealing engagement with the perforations. The plugs 42b may be conveyed by flow 44 through the casing 16, or by flow 52 through the tubular string 12.

The tubular string 12 is repositioned in the casing 16, so that the perforator 48 is now located at the next zone 40c to be completed. The perforator 48 is then used to form perforations 46c through the casing 16 and cement 18, and into the zone 40c. The tubular string 12 may be repositioned before or after the plugs 42b are deployed into the well.

Figure 3D:
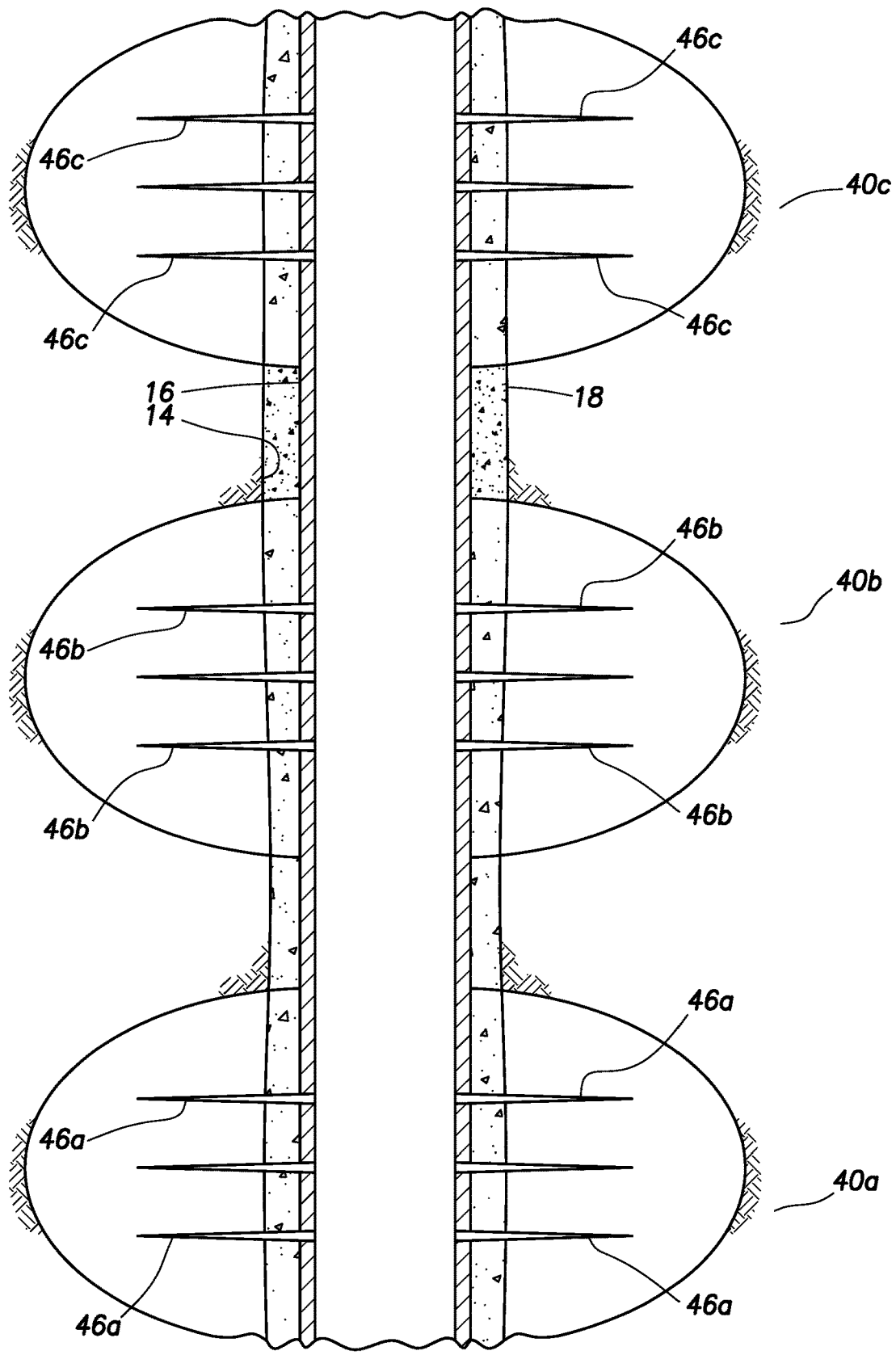

In FIG. 3D, the zone 40c has been fractured by applying increased pressure to the zone via the perforations 46c. The fracturing pressure may be applied, for example, via the annulus 30 from the surface (e.g., using the pump 34 of FIG. 1), or via the tubular string 12 (e.g., using the pump 36 of FIG. 1).

The plugs 42a,b are then degraded and no longer prevent flow through the perforations 46a,b. Thus, as depicted in FIG. 3D, flow is permitted between the interior of the casing 16 and each of the zones 40a-c.

The plugs 42a,b may be degraded in any manner. The plugs 42a,b may degrade in response to application of a degrading treatment, in response to passage of a certain period of time, or in response to exposure to elevated downhole temperature. The degrading treatment could include exposing the plugs 42a,b to a particular type of radiation, such as electromagnetic radiation (e.g., light having a certain wavelength or range of wavelengths, gamma rays, etc.) or "nuclear" particles (e.g., gamma, beta, alpha or neutron).

The plugs 42a,b may degrade by galvanic action or by dissolving. The plugs 42a,b may degrade in response to exposure to a particular fluid, either naturally occurring in the well (such as water or hydrocarbon fluid), or introduced therein (such as a fluid having a particular pH).

Note that any number of zones may be completed in any order in keeping with the principles of this disclosure. The zones 40a-c may be sections of a single earth formation, or they may be sections of separate formations. Although the perforations 46c are not described above as being plugged in the method, the perforations 46c could be plugged after the zone 40c is fractured or otherwise stimulated (e.g., to verify that the plugs are indeed preventing flow from the casing 16 to the zones 40a-c).

In other examples, the plugs 42 may not be degraded. The plugs 42 could instead be mechanically removed, for example, by milling or otherwise cutting the plugs 42 away from the perforations. In any of the method examples described above, after the fracturing operation(s) are completed, the plugs 42 can be milled off or otherwise removed from the perforations 38, 46, 46a,b without dissolving, melting, dispersing or otherwise degrading a material of the plugs.

In some examples, the plugs 42 can be mechanically removed, without necessarily cutting the plugs. A tool with appropriate gripping structures (such as a mill or another cutting or grabbing device) could grab the plugs 42 and pull them from the perforations.

Figure 4A:
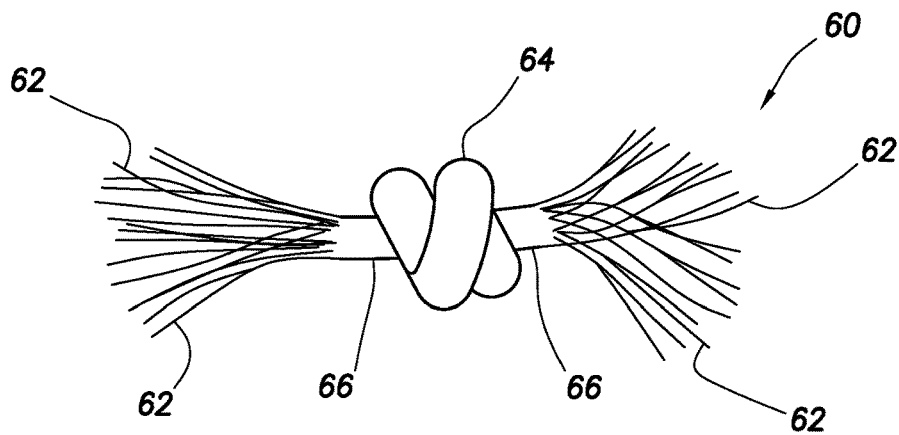
FIGS. 4A & B are enlarged scale representative elevational views of examples of a flow conveyed device that may be used in the system and methods of FIGS. 1-3D, and which can embody the principles of this disclosure.

Referring additionally now to FIG. 4A, an example of a flow conveyed device 60 that can incorporate the principles of this disclosure is representatively illustrated. The device 60 may be used for any of the plugs 42, 42a,b in the method examples described above, or the device may be used in other methods.

The device 60 example of FIG. 4A includes multiple fibers 62 extending outwardly from an enlarged body 64. As depicted in FIG. 4A, each of the fibers 62 has a lateral dimension (e.g., a thickness or diameter) that is substantially smaller than a size (e.g., a thickness or diameter) of the body 64.

The body 64 can be dimensioned so that it will effectively engage and seal off a particular opening in a well. For example, if it is desired for the device 60 to seal off a perforation in a well, the body 64 can be formed so that it is somewhat larger than a diameter of the perforation. If it is desired for multiple devices 60 to seal off multiple openings having a variety of dimensions (such as holes caused by corrosion of the casing 16), then the bodies 64 of the devices can be formed with a corresponding variety of sizes.

In the FIG. 4A example, the fibers 62 are joined together (e.g., by braiding, weaving, cabling, etc.) to form lines 66 that extend outwardly from the body 64. In this example, there are two such lines 66, but any number of lines (including one) may be used in other examples.

The lines 66 may be in the form of one or more ropes, in which case the fibers 62 could comprise frayed ends of the rope(s). In addition, the body 64 could be formed by one or more knots in the rope(s). In some examples, the body 64 can comprise a fabric or cloth, the body could be formed by one or more knots in the fabric or cloth, and the fibers 62 could extend from the fabric or cloth.

In other examples, the device 60 could comprise a single sheet of material, or multiple strips of sheet material. The device 60 could comprise one or more films. The body 64 and lines 66 may not be made of the same material, and the body and/or lines may not be made of a fibrous material.

In the FIG. 4A example, the body 64 is formed by a double overhand knot in a rope, and ends of the rope are frayed, so that the fibers 62 are splayed outward. In this manner, the fibers 62 will cause significant fluid drag when the device 60 is deployed into a flow stream, so that the device will be effectively "carried" by, and "follow," the flow.

However, it should be clearly understood that other types of bodies and other types of fibers may be used in other examples. The body 64 could have other shapes, the body could be hollow or solid, and the body could be made up of one or multiple materials. The fibers 62 are not necessarily joined by lines 66, and the fibers are not necessarily formed by fraying ends of ropes or other lines. The body 64 is not necessarily centrally located in the device 60 (for example, the body could be at one end of the lines 66). Thus, the scope of this disclosure is not limited to the construction, configuration or other details of the device 60 as described herein or depicted in the drawings.

Figure 4B:
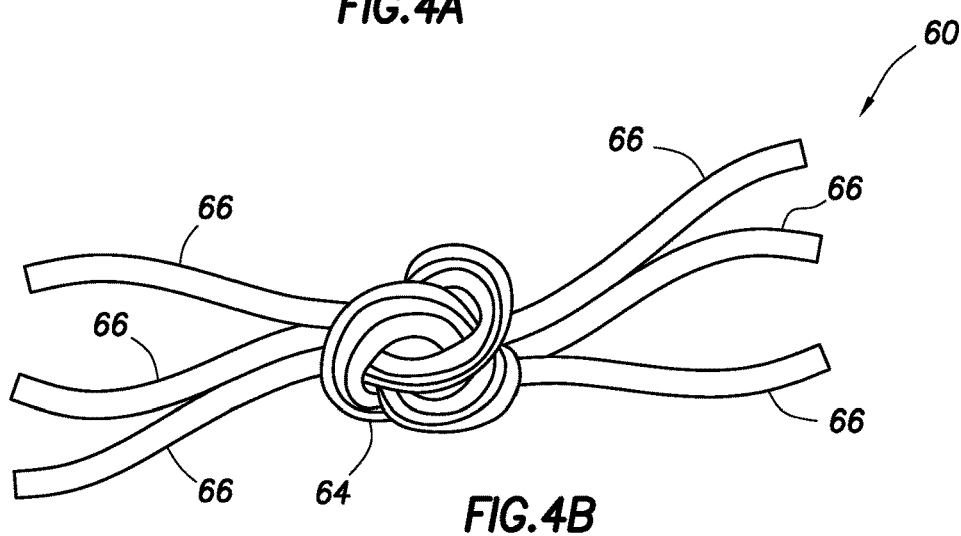

Referring additionally now to FIG. 4B, another example of the device 60 is representatively illustrated. In this example, the device 60 is formed using multiple braided lines 66 of the type known as "mason twine." The multiple lines 66 are knotted (such as, with a double or triple overhand knot or other type of knot) to form the body 64. Ends of the lines 66 are not necessarily be frayed in these examples, although the lines do comprise fibers (such as the fibers 62 described above).

Figure 5:
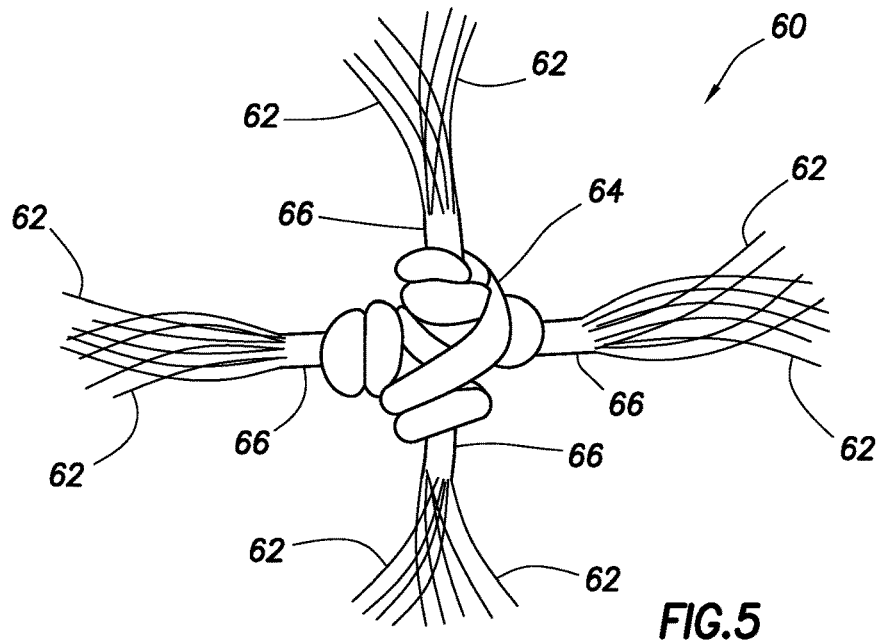
FIG. 5 is a representative elevational view of another example of the flow conveyed device.

Referring additionally now to FIG. 5, another example of the device 60 is representatively illustrated. In this example, four sets of the fibers 62 are joined by a corresponding number of lines 66 to the body 64. The body 64 is formed by one or more knots in the lines 66.

FIG. 5 demonstrates that a variety of different configurations are possible for the device 60. Accordingly, the principles of this disclosure can be incorporated into other configurations not specifically described herein or depicted in the drawings. Such other configurations may include fibers joined to bodies without use of lines, bodies formed by techniques other than knotting, etc.

Referring additionally now to FIGS. 6A & B, an example of a use of the device 60 of FIG. 4 to seal off an opening 68 in a well is representatively illustrated. In this example, the opening 68 is a perforation formed through a sidewall 70 of a tubular string 72 (such as, a casing, liner, tubing, etc.). However, in other examples the opening 68 could be another type of opening, and may be formed in another type of structure.

The device 60 is deployed into the tubular string 72 and is conveyed through the tubular string by fluid flow 74. The fibers 62 of the device 60 enhance fluid drag on the device, so that the device is influenced to displace with the flow 74.

Since the flow 74 (or a portion thereof) exits the tubular string 72 via the opening 68, the device 60 will be influenced by the fluid drag to also exit the tubular string via the opening 68. As depicted in FIG. 6B, one set of the fibers 62 first enters the opening 68, and the body 64 follows. However, the body 64 is appropriately dimensioned, so that it does not pass through the opening 68, but instead is lodged or wedged into the opening. In some examples, the body 64 may be received only partially in the opening 68, and in other examples the body may be entirely received in the opening.

The body 64 may completely or only partially block the flow 74 through the opening 68. If the body 64 only partially blocks the flow 74, any remaining fibers 62 exposed to the flow in the tubular string 72 can be carried by that flow into any gaps between the body and the opening 68, so that a combination of the body and the fibers completely blocks flow through the opening.

In another example, the device 60 may partially block flow through the opening 68, and another material (such as, calcium carbonate, PLA or PGA particles) may be deployed and conveyed by the flow 74 into any gaps between the device and the opening, so that a combination of the device and the material completely blocks flow through the opening.

The device 60 may permanently prevent flow through the opening 68, or the device may degrade to eventually permit flow through the opening. If the device 60 degrades, it may be self-degrading, or it may be degraded in response to any of a variety of different stimuli. Any technique or means for degrading the device 60 (and any other material used in conjunction with the device to block flow through the opening 68) may be used in keeping with the scope of this disclosure.

In other examples, the device 60 may be mechanically removed from the opening 68. For example, if the body 64 only partially enters the opening 68, a mill or other cutting device may be used to cut the body from the opening.

Figure 7:
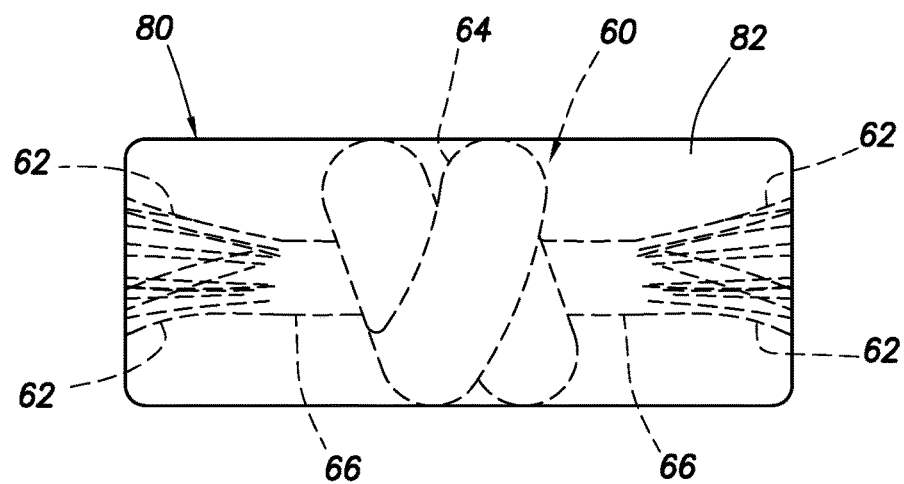
FIGS. 7-9 are representative elevational views of examples of the flow conveyed device with a retainer.
Figure 8:
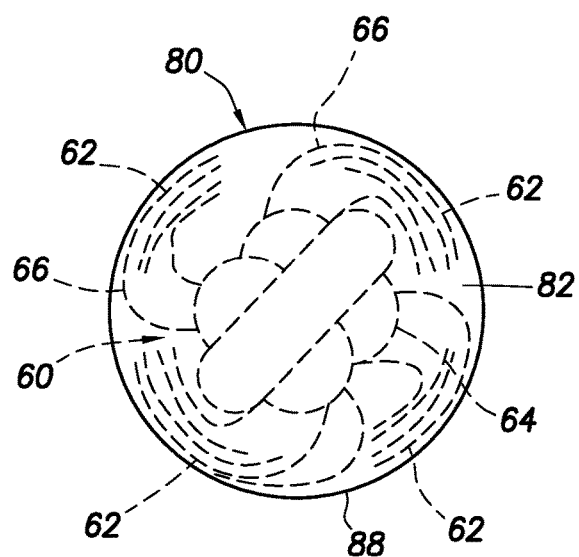
Figure 9:
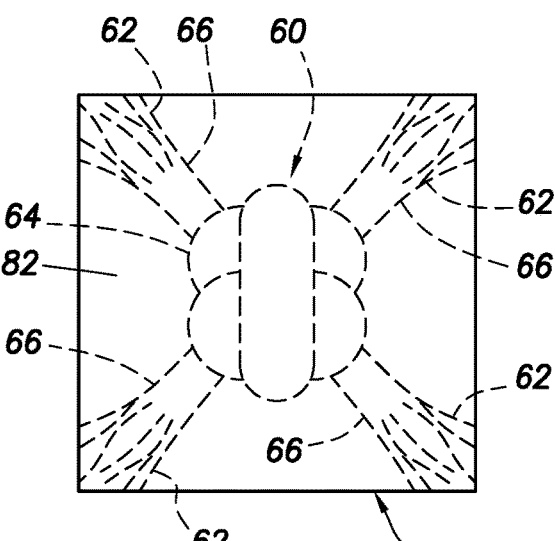

Referring additionally now to FIGS. 7-9, additional examples of the device 60 are representatively illustrated. In these examples, the device 60 is surrounded by, encapsulated in, molded in, or otherwise retained by, a retainer 80.

The retainer 80 aids in deployment of the device 60, particularly in situations where multiple devices are to be deployed simultaneously. In such situations, the retainer 80 for each device 60 prevents the fibers 62 and/or lines 66 from becoming entangled with the fibers and/or lines of other devices.

The retainer 80 could in some examples completely enclose the device 60. In other examples, the retainer 80 could be in the form of a binder that holds the fibers 62 and/or lines 66 together, so that they do not become entangled with those of other devices.

In some examples, the retainer 80 could have a cavity therein, with the device 60 (or only the fibers 62 and/or lines 66) being contained in the cavity. In other examples, the retainer 80 could be molded about the device 60 (or only the fibers 62 and/or lines 66).

During or after deployment of the device 60 into the well, the retainer 80 dissolves, melts, disperses or otherwise degrades, so that the device is capable of sealing off an opening 68 in the well, as described above. For example, the retainer 80 can be made of a material 82 that degrades in a wellbore environment.

The retainer material 82 may degrade after deployment into the well, but before arrival of the device 60 at the opening 68 to be plugged. In other examples, the retainer material 82 may degrade at or after arrival of the device 60 at the opening 68 to be plugged. If the device 60 also comprises a degradable material, then preferably the retainer material 82 degrades prior to the device material.

The material 82 could, in some examples, melt at elevated wellbore temperatures. The material 82 could be chosen to have a melting point that is between a temperature at the earth's surface and a temperature at the opening 68, so that the material melts during transport from the surface to the downhole location of the opening.

The material 82 could, in some examples, dissolve when exposed to wellbore fluid. The material 82 could be chosen so that the material begins dissolving as soon as it is deployed into the wellbore 14 and contacts a certain fluid (such as, water, brine, hydrocarbon fluid, etc.) therein. In other examples, the fluid that initiates dissolving of the material 82 could have a certain pH range that causes the material to dissolve.

Note that it is not necessary for the material 82 to melt or dissolve in the well. Various other stimuli (such as, passage of time, elevated pressure, flow, turbulence, etc.) could cause the material 82 to disperse, degrade or otherwise cease to retain the device 60. The material 82 could degrade in response to any one, or a combination, of: passage of a predetermined period of time in the well, exposure to a predetermined temperature in the well, exposure to a predetermined fluid in the well, exposure to radiation in the well and exposure to a predetermined chemical composition in the well. Thus, the scope of this disclosure is not limited to any particular stimulus or technique for dispersing or degrading the material 82, or to any particular type of material.

In some examples, the material 82 can remain on the device 60, at least partially, when the device engages the opening 68. For example, the material 82 could continue to cover the body 64 (at least partially) when the body engages and seals off the opening 68. In such examples, the material 82 could advantageously comprise a relatively soft, viscous and/or resilient material, so that sealing between the device 60 and the opening 68 is enhanced.

Suitable relatively low melting point substances that may be used for the material 82 can include wax (e.g., paraffin wax, vegetable wax), ethylene-vinyl acetate copolymer (e.g., ELVAX™ available from DuPont), atactic polypropylene, and eutectic alloys. Suitable relatively soft substances that may be used for the material 82 can include a soft silicone composition or a viscous liquid or gel.

Suitable dissolvable materials can include PLA, PGA, anhydrous boron compounds (such as anhydrous boric oxide and anhydrous sodium borate), polyvinyl alcohol, polyethylene oxide, salts and carbonates. The dissolution rate of a water-soluble polymer (e.g., polyvinyl alcohol, polyethylene oxide) can be increased by incorporating a water-soluble plasticizer (e.g., glycerin), or a rapidly-dissolving salt (e.g., sodium chloride, potassium chloride), or both a plasticizer and a salt.

In FIG. 7, the retainer 80 is in a cylindrical form. The device 60 is encapsulated in, or molded in, the retainer material 82. The fibers 62 and lines 66 are, thus, prevented from becoming entwined with the fibers and lines of any other devices 60.

In FIG. 8, the retainer 80 is in a spherical form. In addition, the device 60 is compacted, and its compacted shape is retained by the retainer material 82. A shape of the retainer 80 can be chosen as appropriate for a particular device 60 shape, in compacted or un-compacted form.

In FIG. 9, the retainer 80 is in a cubic form. Thus, any type of shape (polyhedron, spherical, cylindrical, etc.) may be used for the retainer 80, in keeping with the principles of this disclosure.

Figure 10:
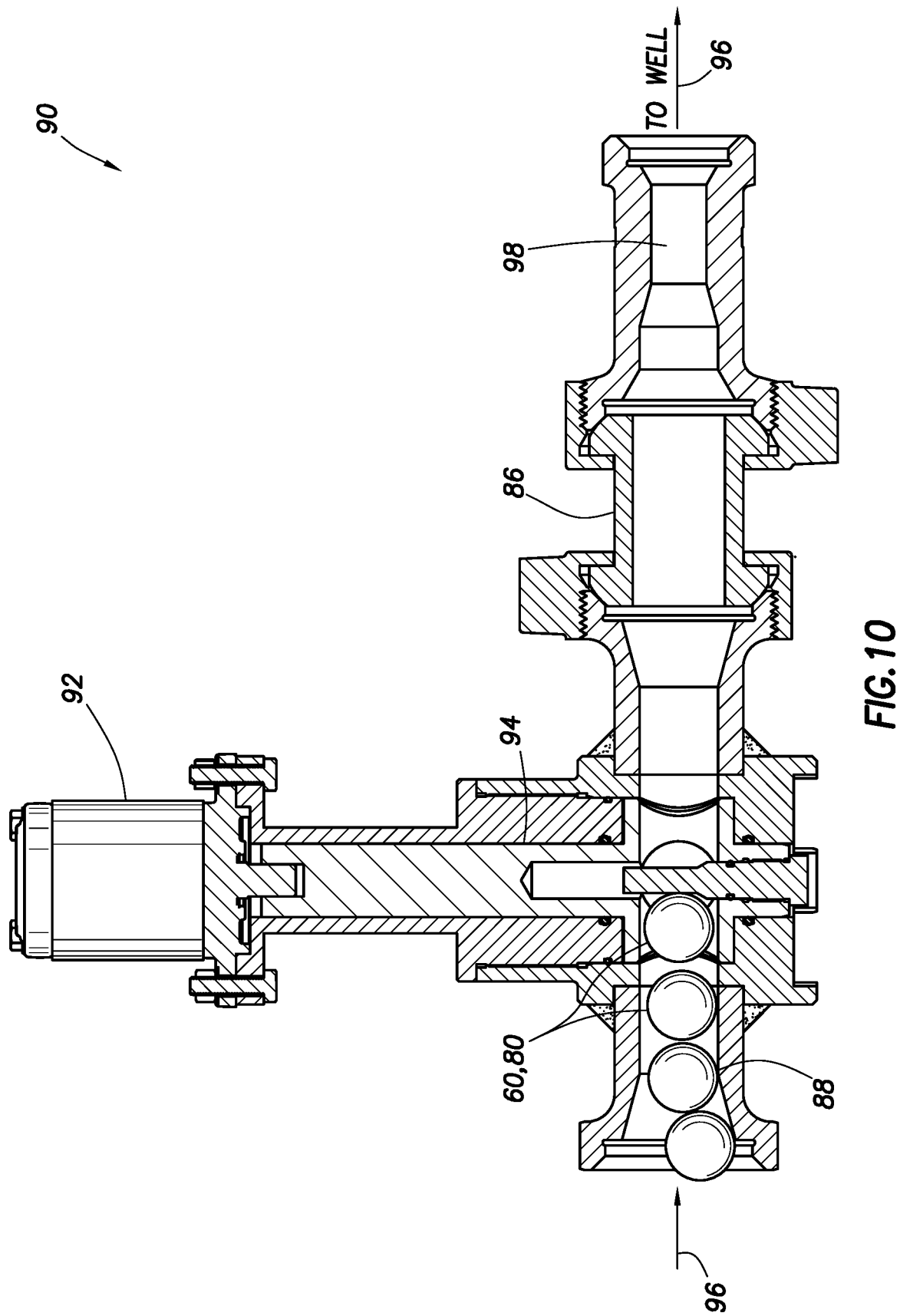
FIG. 10 is a representative cross-sectional view of an example of a deployment apparatus and method that can embody the principles of this disclosure.

Referring additionally now to FIG. 10, an example of a deployment apparatus 90 and an associated method are representatively illustrated. The apparatus 90 and method may be used with the system 10 and method described above, or they may be used with other systems and methods.

When used with the system 10, the apparatus 90 can be connected between the pump 34 and the casing valve 32 (see FIG. 1). Alternatively, the apparatus 90 can be "teed" into a pipe associated with the pump 34 and casing valve 32, or into a pipe associated with the pump 36 (for example, if the devices 60 are to be deployed via the tubular string 12). However configured, an output of the apparatus 90 is connected to the well, although the apparatus itself may be positioned a distance away from the well.

The apparatus 90 is used in this example to deploy the devices 60 into the well. The devices 60 may or may not be retained by the retainer 80 when they are deployed. However, in the FIG. 10 example, the devices 60 are depicted with the retainers 80 in the spherical shape of FIG. 8, for convenience of deployment. The retainer material 82 can be at least partially dispersed during the deployment, so that the devices 60 are more readily conveyed by the flow 74.

In certain situations, it can be advantageous to provide a certain spacing between the devices 60 during deployment, for example, in order to efficiently plug casing perforations. One reason for this is that the devices 60 will tend to first plug perforations that are receiving highest rates of flow.

In addition, if the devices 60 are deployed downhole too close together, some of them can become trapped between perforations, thereby wasting some of the devices. The excess "wasted" devices 60 might later interfere with other well operations.

To mitigate such problems, the devices 60 can be deployed with a selected spacing. The spacing may be, for example, on the order of the length of the perforation interval. The apparatus 90 is desirably capable of deploying the devices 60 with any selected spacing between the devices.

Each device 60 in this example has the retainer 80 in the form of a dissolvable coating material with a frangible coating 88 thereon, to impart a desired geometric shape (spherical in this example), and to allow for convenient deployment. The dissolvable retainer material 82 could be detrimental to the operation of the device 60 if it increases a drag coefficient of the device. A high coefficient of drag can cause the devices 60 to be swept to a lower end of the perforation interval, instead of sealing uppermost perforations.

The frangible coating 88 is used to prevent the dissolvable coating from dissolving during a queue time prior to deployment. Using the apparatus 90, the frangible coating 88 can be desirably broken, opened or otherwise damaged during the deployment process, so that the dissolvable coating is then exposed to fluids that can cause the coating to dissolve.

Examples of suitable frangible coatings include cementitious materials (e.g., plaster of Paris) and various waxes (e.g., paraffin wax, carnauba wax, vegetable wax, machinable wax). The frangible nature of a wax coating can be optimized for particular conditions by blending a less brittle wax (e.g., paraffin wax) with a more brittle wax (e.g., carnauba wax) in a certain ratio selected for the particular conditions.

As depicted in FIG. 10, the apparatus 90 includes a rotary actuator 92 (such as, a hydraulic or electric servo motor, with or without a rotary encoder). The actuator 92 rotates a sequential release structure 94 that receives each device 60 in turn from a queue of the devices, and then releases each device one at a time into a conduit 86 that is connected to the tubular string 72 (or the casing 16 or tubing 20 of FIG. 1).

Note that it is not necessary for the actuator 92 to be a rotary actuator, since other types of actuators (such as, a linear actuator) may be used in other examples. In addition, it is not necessary for only a single device 60 to be deployed at a time. In other examples, the release structure 94 could be configured to release multiple devices at a time. Thus, the scope of this disclosure is not limited to any particular details of the apparatus 90 or the associated method as described herein or depicted in the drawings.

In the FIG. 10 example, a rate of deployment of the devices 60 is determined by an actuation speed of the actuator 92. As a speed of rotation of the structure 94 increases, a rate of release of the devices 60 from the structure accordingly increases. Thus, the deployment rate can be conveniently adjusted by adjusting an operational speed of the actuator 92. This adjustment could be automatic, in response to well conditions, stimulation treatment parameters, flow rate variations, etc.

As depicted in FIG. 10, a liquid flow 96 enters the apparatus 90 from the left and exits on the right (for example, at about 1 barrel per minute). Note that the flow 96 is allowed to pass through the apparatus 90 at any position of the release structure 94 (the release structure is configured to permit flow through the structure at any of its positions).

When the release structure 94 rotates, one or more of the devices 60 received in the structure rotates with the structure. When a device 60 is on a downstream side of the release structure 94, the flow 96 though the apparatus 90 carries the device to the right (as depicted in FIG. 10) and into a restriction 98.

The restriction 98 in this example is smaller than the diameter of the device 60. The flow 96 causes the device 60 to be forced through the restriction 98, and the frangible coating 88 is thereby damaged, opened or fractured to allow the inner dissolvable material 82 of the retainer 80 to dissolve.

Other ways of opening, breaking or damaging a frangible coating may be used in keeping with the principles of this disclosure. For example, cutters or abrasive structures could contact an outside surface of a device 60 to penetrate, break, abrade or otherwise damage the frangible coating 88. Thus, this disclosure is not limited to any particular technique for damaging, breaking, penetrating or otherwise compromising a frangible coating.

Figure 11:
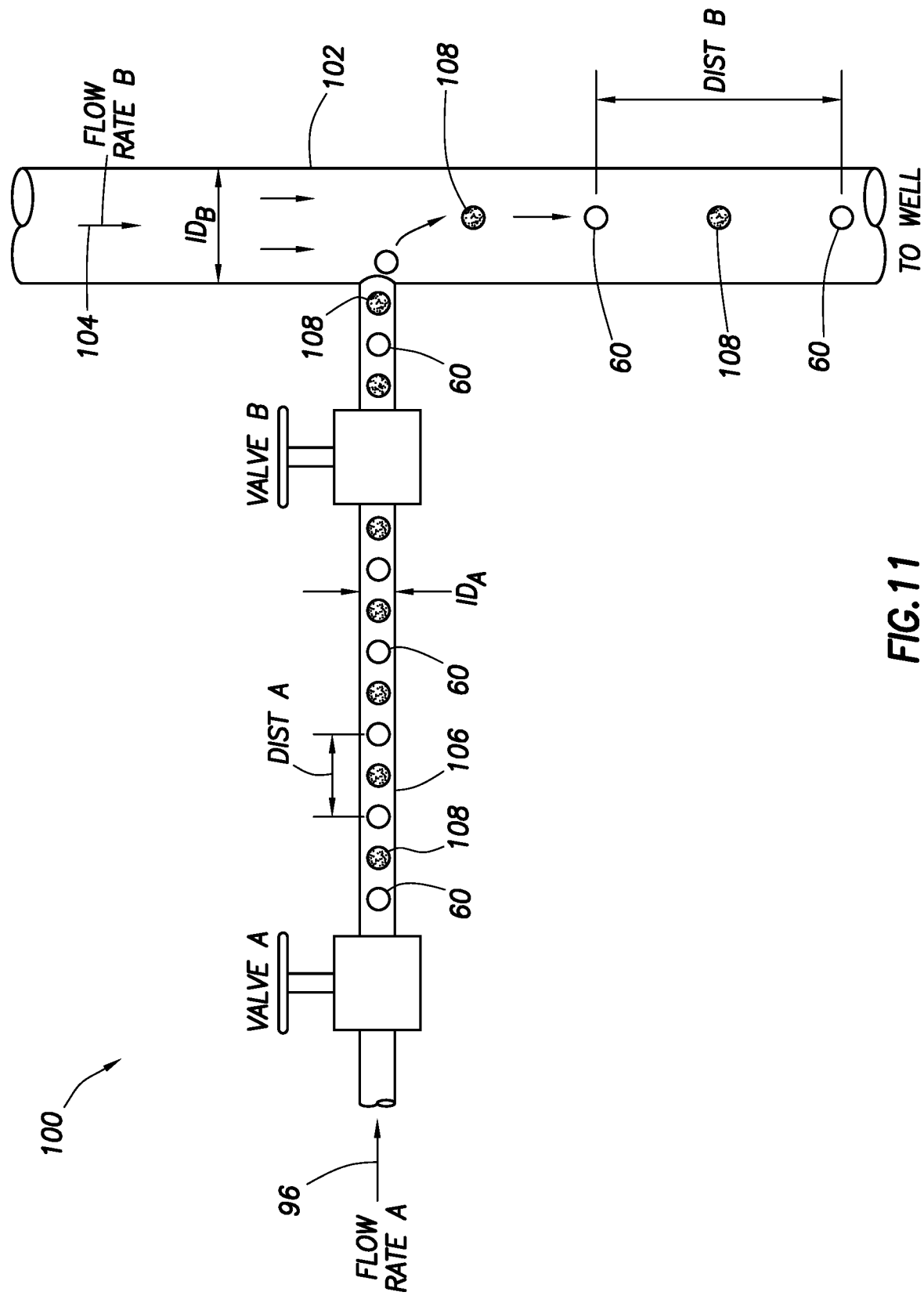
FIG. 11 is a representative schematic view of another example of a deployment apparatus and method that can embody the principles of this disclosure.

Referring additionally now to FIG. 11, another example of a deployment apparatus 100 and an associated method are representatively illustrated. The apparatus 100 and method may be used with the system 10 and method described above, or they may be used with other systems and methods.

In the FIG. 11 example, the devices 60 are deployed using two flow rates. Flow rate A through two valves (valves A & B) is combined with Flow rate B through a pipe 102 depicted as being vertical in FIG. 11 (the pipe may be horizontal or have any other orientation in actual practice).

The pipe 102 may be associated with the pump 34 and casing valve 32, or the pipe may be associated with the pump 36 if the devices 60 are to be deployed via the tubular string 12. In some examples, a separate pump (not shown) may be used to supply the flow 96 through the valves A & B.

Valve A is not absolutely necessary, but may be used to control a queue of the devices 60. When valve B is open the flow 96 causes the devices 60 to enter the vertical pipe 102. Flow 104 through the vertical pipe 102 in this example is substantially greater than the flow 96 through the valves A & B (that is, flow rate B>>flow rate A), although in other examples the flows may be substantially equal or otherwise related.

A spacing (dist. B) between the devices 60 when they are deployed into the well can be calculated as follows: dist. B=dist. A*$(ID_A^2/ID_B^2)$*(flow rate B/flow rate A), where dist. A is a spacing between the devices 60 prior to entering the pipe 102, $ID_A$ is an inner diameter of a pipe 106 connected to the pipe 102, and $ID_A$ is an inner diameter of the pipe 102. This assumes circular pipes 102, 104. Where corresponding passages are non-circular, the term $ID_A^2/ID_B^2$ can be replaced by an appropriate ratio of passage areas.

The spacing between the plugging devices 60 in the well (dist. B) can be automatically controlled by varying one or both of the flow rates A, B. For example, the spacing can be increased by increasing the flow rate B or decreasing the flow rate A. The flow rate(s) A, B can be automatically adjusted in response to changes in well conditions, stimulation treatment parameters, flow rate variations, etc.

In some examples, flow rate A can have a practical minimum of about ½ barrel per minute. In some circumstances, the desired deployment spacing (dist. B) may be greater than what can be produced using a convenient spacing dist. A of the devices 60 and the flow rate A in the pipe 106.

The deployment spacing B may be increased by adding spacers 108 between the devices 60 in the pipe 106. The spacers 108 effectively increase the distance A between the devices 60 in the pipe 106 (and, thus, increase the value of dist. A in the equation above).

The spacers 108 may be dissolvable or otherwise dispersible, so that they dissolve or degrade when they are in the pipe 102 or thereafter. In some examples, the spacers 108 may be geometrically the same as, or similar to, the devices 60.

Note that the apparatus 100 may be used in combination with the restriction 98 of FIG. 10 (for example, with the restriction 98 connected downstream of the valve B but upstream of the pipe 102). In this manner, a frangible or other protective coating on the devices 60 and/or spacers 108 can be opened, broken or otherwise damaged prior to the devices and spacers entering the pipe 102.

Figure 12:
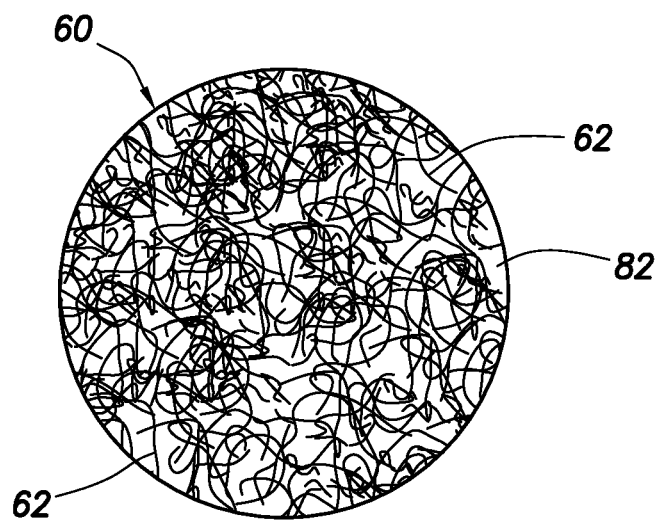
FIGS. 12 & 13 are representative cross-sectional views of additional examples of the flow conveyed device.
Figure 13:
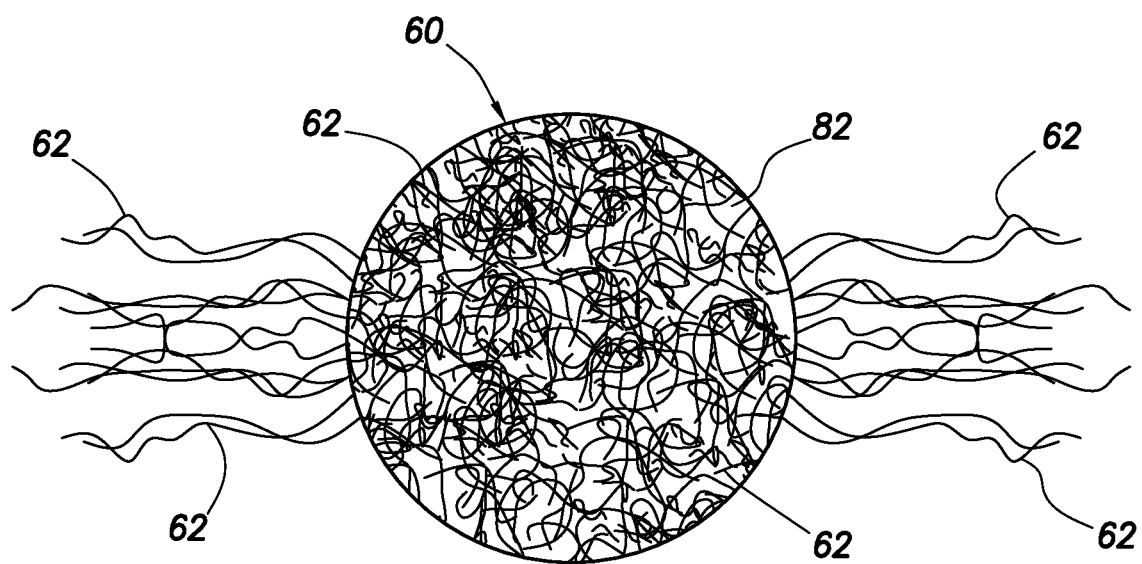

Referring additionally now to FIG. 12, a cross-sectional view of another example of the device 60 is representatively illustrated. The device 60 may be used in any of the systems and methods described herein, or may be used in other systems and methods.

In this example, the body of the device 60 is made up of filaments or fibers 62 formed in the shape of a ball or sphere. Of course, other shapes may be used, if desired.

The filaments or fibers 62 may make up all, or substantially all, of the device 60. The fibers 62 may be randomly oriented, or they may be arranged in various orientations as desired.

In the FIG. 12 example, the fibers 62 are retained by the dissolvable, degradable or dispersible material 82. In addition, a frangible coating may be provided on the device 60, for example, in order to delay dissolving of the material 82 until the device has been deployed into a well (as in the example of FIG. 10).

The device 60 of FIG. 12 can be used in a diversion fracturing operation (in which perforations receiving the most fluid are plugged to divert fluid flow to other perforations), in a re-completion operation (e.g., as in the FIGS. 2A-D example), or in a multiple zone perforate and fracture operation (e.g., as in the FIGS. 3A-D example).

One advantage of the FIG. 12 device 60 is that it is capable of sealing on irregularly shaped openings, perforations, leak paths or other passageways. The device 60 can also tend to "stick" or adhere to an opening, for example, due to engagement between the fibers 62 and structure surrounding (and in) the opening. In addition, there is an ability to selectively seal openings.

The fibers 62 could, in some examples, comprise wool fibers. The device 60 may be reinforced (e.g., using the material 82 or another material) or may be made entirely of fibrous material with a substantial portion of the fibers 62 randomly oriented.

The fibers 62 could, in some examples, comprise metal wool, or crumpled and/or compressed wire. Wool may be retained with wax or other material (such as the material 82) to form a ball, sphere, cylinder or other shape.

In the FIG. 12 example, the material 82 can comprise a wax (or eutectic metal or other material) that melts at a selected predetermined temperature. A wax device 60 may be reinforced with fibers 62, so that the fibers and the wax (material 82) act together to block a perforation or other passageway.

The selected melting point can be slightly below a static wellbore temperature. The wellbore temperature during fracturing is typically depressed due to relatively low temperature fluids entering wellbore. After fracturing, wellbore temperature will typically increase, thereby melting the wax and releasing the reinforcement fibers 62.

Figure 14:
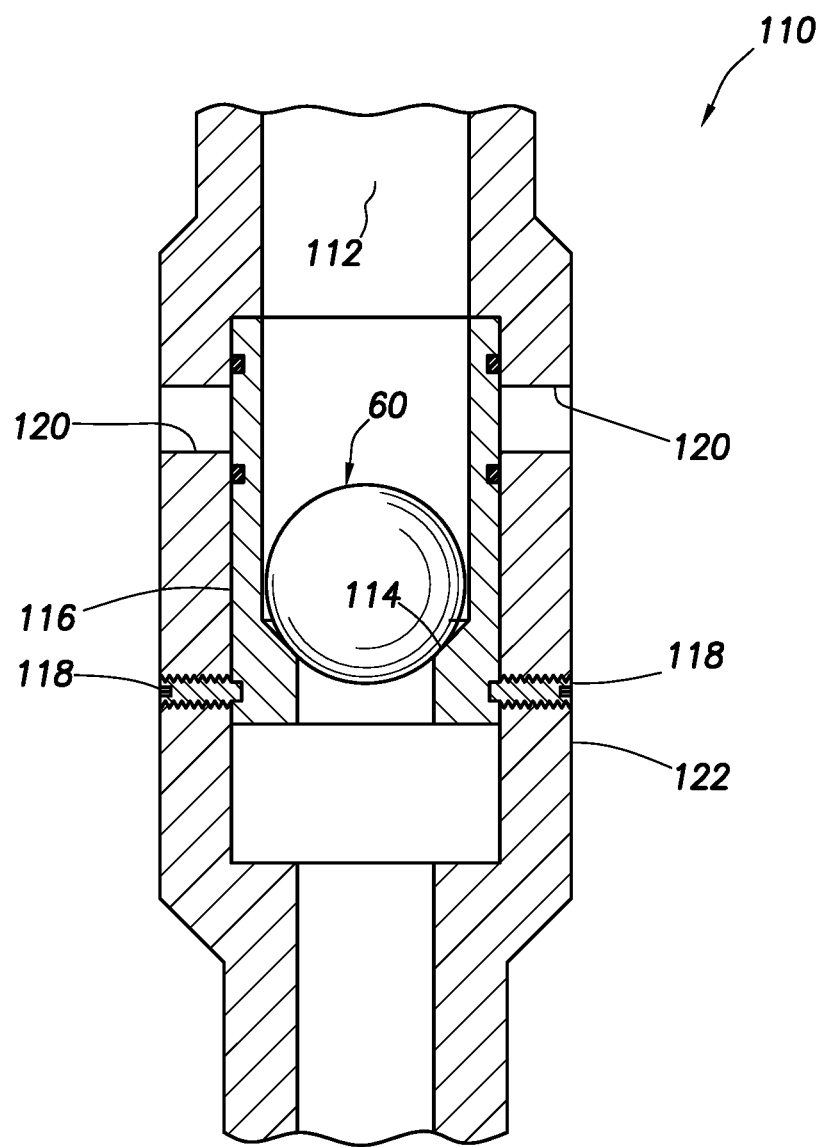
FIG. 14 is a representative cross-sectional view of a well tool that may be operated using the flow conveyed device.

This type of device 60 in the shape of a ball or other shapes may be used to operate downhole tools in a similar fashion. In FIG. 14, a well tool 110 is depicted with a passageway 112 extending longitudinally through the well tool. The well tool 110 could, for example, be connected in the casing 16 of FIG. 1, or it could be connected in another tubular string (such as a production tubing string, the tubular string 12, etc.).

The device 60 is depicted in FIG. 14 as being sealingly engaged with a seat 114 formed in a sliding sleeve 116 of the well tool 110. When the device 60 is so engaged in the well tool 110 (for example, after the well tool is deployed into a well and appropriately positioned), a pressure differential may be produced across the device and the sliding sleeve 116, in order to shear frangible members 118 and displace the sleeve downward (as viewed in FIG. 14), thereby allowing flow between the passageway 112 and an exterior of the well tool 110 via openings 120 formed through an outer housing 122.

The material 82 of the device 60 can then dissolve, disperse or otherwise degrade to thereby permit flow through the passageway 112. Of course, other types of well tools (such as, packer setting tools, frac plugs, testing tools, etc.) may be operated or actuated using the device 60 in keeping with the scope of this disclosure.

A drag coefficient of the device 60 in any of the examples described herein may be modified appropriately to produce a desired result. For example, in a diversion fracturing operation, it is typically desirable to block perforations in a certain location in a wellbore. The location is usually at the perforations taking the most fluid.

Natural fractures in an earth formation penetrated by the wellbore make it so that certain perforations receive a larger portion of fracturing fluids. For these situations and others, the device 60 shape, size, density and other characteristics can be selected, so that the device tends to be conveyed by flow to a certain corresponding section of the wellbore.

For example, devices 60 with a larger coefficient of drag (Cd) may tend to seat more toward a toe of a generally horizontal or lateral wellbore. Devices 60 with a smaller Cd may tend to seat more toward a heel of the wellbore. For example, if the wellbore 14 depicted in FIG. 2B is horizontal or highly deviated, the heel would be at an upper end of the illustrated wellbore, and the toe would be at the lower end of the illustrated wellbore (e.g., the direction of the fluid flow 44 is from the heel to the toe).

Smaller devices 60 with long fibers 62 floating freely (see the example of FIG. 13) may have a strong tendency to seat at or near the heel. A diameter of the device 60 and the free fiber 62 length can be appropriately selected, so that the device is more suited to stopping and sealingly engaging perforations anywhere along the length of the wellbore.

Acid treating operations can benefit from use of the device 60 examples described herein. Pumping friction causes hydraulic pressure at the heel to be considerably higher than at the toe. This means that the fluid volume pumped into a formation at the heel will be considerably higher than at the toe. Turbulent fluid flow increases this effect. Gelling additives might reduce an onset of turbulence and decrease the magnitude of the pressure drop along the length of the wellbore.

Higher initial pressure at the heel allows zones to be acidized and then plugged starting at the heel, and then progressively down along the wellbore. This mitigates waste of acid from attempting to acidize all of the zones at the same time.

The free fibers 62 of the FIGS. 4-6B & 13 examples greatly increase the ability of the device 60 to engage the first open perforation (or other leak path) it encounters. Thus, the devices 60 with low Cd and long fibers 62 can be used to plug from upper perforations to lower perforations, while turbulent acid with high frictional pressure drop is used so that the acid treats the unplugged perforations nearest the top of the wellbore with acid first.

In examples of the device 60 where a wax material (such as the material 82) is used, the fibers 62 (including the body 64, lines 66, knots, etc.) may be treated with a treatment fluid that repels wax (e.g., during a molding process). This may be useful for releasing the wax from the fibrous material after fracturing or otherwise compromising the retainer 80 and/or a frangible coating thereon.

Suitable release agents are water-wetting surfactants (e.g., alkyl ether sulfates, high hydrophilic-lipophilic balance (HLB) nonionic surfactants, betaines, alkyarylsulfonates, alkyldiphenyl ether sulfonates, alkyl sulfates). The release fluid may also comprise a binder to maintain the knot or body 64 in a shape suitable for molding. One example of a binder is a polyvinyl acetate emulsion.

Broken-up or fractured devices 60 can have lower Cd. Broken-up or fractured devices 60 can have smaller cross-sections and can pass through the annulus 30 between tubing 20 and casing 16 more readily.

The restriction 98 (see FIG. 10) may be connected in any line or pipe that the devices 60 are pumped through, in order to cause the devices to fracture as they pass through the restriction. This may be used to break up and separate devices 60 into wax and non-wax parts. The restriction 98 may also be used for rupturing a frangible coating covering a soluble wax material 82 to allow water or other well fluids to dissolve the wax.

Fibers 62 may extend outwardly from the device 60, whether or not the body 64 or other main structure of the device also comprises fibers. For example, a ball (or other shape) made of any material could have fibers 62 attached to and extending outwardly therefrom. Such a device 60 will be better able to find and cling to openings, holes, perforations or other leak paths near the heel of the wellbore, as compared to the ball (or other shape) without the fibers 62.

For any of the device 60 examples described herein, the fibers 62 may not dissolve, disperse or otherwise degrade in the well. In such situations, the devices 60 (or at least the fibers 62) may be removed from the well by swabbing, scraping, circulating, milling or other mechanical methods.

In situations where it is desired for the fibers 62 to dissolve, disperse or otherwise degrade in the well, nylon is a suitable acid soluble material for the fibers. Nylon 6 and nylon 66 are acid soluble and suitable for use in the device 60. At relatively low well temperatures, nylon 6 may be preferred over nylon 66, because nylon 6 dissolves faster or more readily.

Self-degrading fiber devices 60 can be prepared from poly-lactic acid (PLA), poly-glycolic acid (PGA), or a combination of PLA and PGA fibers 62. Such fibers 62 may be used in any of the device 60 examples described herein.

Fibers 62 can be continuous monofilament or multifilament, or chopped fiber. Chopped fibers 62 can be carded and twisted into yarn that can be used to prepare fibrous flow conveyed devices 60.

The PLA and/or PGA fibers 62 may be coated with a protective material, such as calcium stearate, to slow its reaction with water and thereby delay degradation of the device 60. Different combinations of PLA and PGA materials may be used to achieve corresponding different degradation times or other characteristics.

PLA resin can be spun into fiber of 1-15 denier, for example. Smaller diameter fibers 62 will degrade faster. Fiber denier of less than 5 may be most desirable. PLA resin is commercially available with a range of melting points (e.g., 140 to 365° F.). Fibers 62 spun from lower melting point PLA resin can degrade faster.

PLA bi-component fiber has a core of high-melting point PLA resin and a sheath of low-melting point PLA resin (e.g., 140° F. melting point sheath on a 265° F. melting point core). The low-melting point resin can hydrolyze more rapidly and generate acid that will accelerate degradation of the high-melting point core. This may enable the preparation of a fibrous device 60 that will have higher strength in a wellbore environment, yet still degrade in a reasonable time. In various examples, a melting point of the resin can decrease in a radially outward direction in the fiber.

It may now be fully appreciated that the above disclosure provides significant advancements to the art of controlling flow in subterranean wells. In some examples described above, the device 60 may be used to block flow through openings in a well, with the device being uniquely configured so that its conveyance with the flow is enhanced and/or its sealing engagement with an opening is enhanced. A deployment apparatus 100 can be used to deploy the devices 60 into the well, so that a desired spacing between the devices is achieved.

In one aspect, a fibrous plugging device 60 for use in a subterranean well is provided to the art by the above disclosure. In one example, the device 60 can comprise a body 64 including fibers 62 and a retainer material 82. The retainer material 82 retains a shape (e.g., cylindrical, spherical, cubic, etc.) of the body 64.

The fibers 62 may comprise a material selected from the group consisting of metal wool, wire, nylon 6 and nylon 66.

The fibers 62 may comprise a core and a sheath overlying the core. A poly-lactic acid resin in the sheath can have a lower melting point than a poly-lactic acid resin in the core. The melting point of the poly-lactic acid resin in each of the fibers 62 decreases in an outward direction.

The fibers 62 may be included in a yarn. The fibers 62 may comprise a material selected from the group consisting of poly-lactic acid and poly-glycolic acid. The fibers 62 may be in a form selected from the group consisting of a) a yarn, b) monofilament, c) multifilament and d) fabric.

The fibers 62 may be treated with a release agent that repels the retainer material 82. The release agent may comprise a water-wetting surfactant. The water-wetting surfactant may be selected from the group consisting of alkyl ether sulfate, relatively high hydrophilic-lipophilic balance nonionic surfactant, betaine, alkylarylsulfonate, alkyl-diphenyl ether sulfonate and alkyl sulfate.

The fibers 62 may extend outwardly from the body 64.

A system 10 for use with a well is also provided to the art by the above disclosure. In one example, the system 10 can comprise a fibrous plugging device 60 conveyed by fluid flow 74 in the well. The fibrous plugging device 60 includes a body 64 comprising multiple fibers 62. The fibrous plugging device 60 engages an opening 68 in the well, and thereby seals off the opening.

The opening 68 may be formed in a well tool 110. The opening 68 may be circumscribed by a seat 114 that is sealingly engaged by the fibrous plugging device 60. The well tool 110 may comprise a valve.

A method for use with a subterranean well is also described above. In one example, the method can comprise flowing a fluid 74 through the well, thereby conveying at least one fibrous plugging device 60 including a body 64 comprising multiple fibers 62; and the fibrous plugging device 60 sealingly engaging at least one opening 68 in the well, thereby substantially preventing flow through the opening.

Multiple openings 68 may be distributed between a heel and a toe of a wellbore 14. Multiple fibrous plugging devices 60 may sealingly engaging the openings 68 progressively from the heel to the toe of the wellbore 14.

The multiple fibrous plugging devices 60 may have different drag coefficients. The bodies 64 of the fibrous plugging devices 60 may have different sizes. The fibers 62 of the fibrous plugging devices 60 may extend different lengths outwardly from the bodies 64 of the fibrous plugging devices.

The fibrous plugging device 60 may degrade in the well. The method may include mechanically removing the fibrous plugging device 60 from the opening 68.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A fibrous plugging device for use in a subterranean well, the device comprising:

a body including fibers and a retainer material, wherein the retainer material retains a shape of the body, and wherein the fibers are treated with a release agent that repels the retainer material.

2. The fibrous plugging device of claim 1, wherein the fibers comprise a material selected from the group consisting of metal wool, wire, nylon 6 and nylon 66.

3. The fibrous plugging device of claim 1, wherein a melting point of a poly-lactic acid resin in each of the fibers decreases in an outward direction.

4. The fibrous plugging device of claim 1, wherein the fibers comprise a material selected from the group consisting of poly-lactic acid and poly-glycolic acid, and wherein the fibers are in a form selected from the group consisting of a) a yarn, b) monofilament, c) multifilament and d) fabric.

5. The fibrous plugging device of claim 1, wherein the release agent comprises a water-wetting surfactant.

6. The fibrous plugging device of claim 5, wherein the water-wetting surfactant is selected from the group consisting of alkyl ether sulfate, high hydrophilic-lipophilic balance nonionic surfactant, betaine, alkylarylsulfonate, alkyldiphenyl ether sulfonate and alkyl sulfate.

7. The fibrous plugging device of claim 1, wherein the fibers extend outwardly from the body.

\* \* \* \* \*